United States Patent
Liu

(10) Patent No.: US 12,036,474 B2
(45) Date of Patent: Jul. 16, 2024

(54) VIRTUAL OBJECT CONTROL METHOD AND APPARATUS, DEVICE, AND READABLE STORAGE MEDIUM

(71) Applicant: Tencent Technology (Shenzhen) Company Limited, Shenzhen (CN)

(72) Inventor: Zhihong Liu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 230 days.

(21) Appl. No.: 17/667,359

(22) Filed: Feb. 8, 2022

(65) Prior Publication Data

US 2022/0152501 A1    May 19, 2022

Related U.S. Application Data

(63) Continuation of application No. PCT/CN2020/123658, filed on Oct. 26, 2020.

(30) Foreign Application Priority Data

Jan. 15, 2020  (CN) .......................... 202010041052.9

(51) Int. Cl.
   *A63F 13/55*     (2014.01)
   *A63F 13/533*    (2014.01)
   *A63F 13/5378*   (2014.01)

(52) U.S. Cl.
   CPC ............ *A63F 13/55* (2014.09); *A63F 13/533* (2014.09); *A63F 13/5378* (2014.09); *A63F 2300/307* (2013.01); *A63F 2300/308* (2013.01)

(58) Field of Classification Search
   None
   See application file for complete search history.

(56) References Cited

U.S. PATENT DOCUMENTS

| 6,128,018 A | 10/2000 | Nakajima |
| 2011/0086702 A1* | 4/2011 | Borst .................... A63F 13/44 463/30 |

(Continued)

FOREIGN PATENT DOCUMENTS

| CN | 108159692 A | 6/2018 |
| CN | 108888952 A | 11/2018 |

(Continued)

OTHER PUBLICATIONS

Tencent Technology, WO, PCT/CN2020/123658, Jan. 27, 2021, 6 pgs.

(Continued)

*Primary Examiner* — Ronald Laneau
(74) *Attorney, Agent, or Firm* — Morgan, Lewis & Bockius LLP

(57) ABSTRACT

This application discloses a virtual object control method performed by an electronic device. The method includes: displaying an environment picture, a virtual environment including a bonus draw prop; obtaining, in response to a target virtual object being located in an interactive distance range of the bonus draw prop, a teleportation skill from the bonus draw prop; displaying, when a skill display condition is met, a teleportation skill control used for triggering the teleportation skill; and moving the target virtual object from a first position to a second position in response to receiving a trigger operation for the teleportation skill associated with the teleportation skill control. In this way, the human-computer interaction efficiency in a process of controlling the target virtual object to move is improved.

20 Claims, 13 Drawing Sheets

(56) References Cited

U.S. PATENT DOCUMENTS

| | | |
|---|---|---|
| 2018/0147488 A1 | 5/2018 | Tang et al. |
| 2018/0154264 A1 | 6/2018 | Sato et al. |
| 2018/0369693 A1 | 12/2018 | Rong |
| 2019/0255437 A1 | 8/2019 | Wang et al. |
| 2022/0072428 A1* | 3/2022 | Hu ............... A63F 13/2145 |
| 2022/0362673 A1* | 11/2022 | Wei ............... A63F 13/426 |
| 2022/0379219 A1* | 12/2022 | Yang ............. A63F 13/822 |
| 2023/0347246 A1* | 11/2023 | Jiang ............. A63F 13/55 |

FOREIGN PATENT DOCUMENTS

| | | |
|---|---|---|
| CN | 109806579 A | 5/2019 |
| CN | 110448905 A | 11/2019 |
| CN | 110496392 A | 11/2019 |
| CN | 111249730 A | 6/2020 |
| EP | 1475133 A1 | 11/2004 |
| JP | 2002263371 A | 9/2002 |
| JP | 2019155172 A | 9/2019 |
| JP | 2020039403 A | 3/2020 |
| JP | 2022056813 A | 4/2022 |
| KR | 20200006853 A | 1/2020 |

OTHER PUBLICATIONS

Tencent Technology, IPRP, PCT/CN2020/123658, Jul. 19, 2022, 7 pgs.

Tencent Technology, ISR, PCT/CN2020/123658, Jan. 27, 2021, 3 pgs.

"Chronic Roguelike Addiction Syndrome", Hengban Strategy for Beginners, 9 pgs., Retrieved from the Internet: https://web.archive.org/web/20190923114719/http://roguelike.namekuji.jp:80/index.html.

Linerevo, "[Lineage Revo] Treasure Chest Contents and Hit Summary [Lineage 2 Revolution]", Sep. 23, 2017, 18 pgs., Retrieved from the Internet: https://xn--18j5d9a2a.com/lineage2revolution-takarabako.

"Nobunaga's Ambition Online", 12 pgs., Retrieved from the Internet: https://www.gamecity.ne.jp/nol/topics_cms/event/21188.html.

Tencent Technology, Japanese Office Action, JP Patent Application No. 2022-520113, Apr. 24, 2023, 10 pgs.

Extended European Search Report, EP20914537.4, Oct. 27, 2022, 7 pgs.

* cited by examiner

VIRTUAL OBJECT CONTROL METHOD AND APPARATUS, DEVICE, AND READABLE STORAGE MEDIUM

CROSS-REFERENCE TO RELATED APPLICATIONS

This application is a continuation application of PCT Patent Application No. PCT/CN2020/123658, entitled "VIRTUAL OBJECT CONTROL METHOD AND APPARATUS, DEVICE, AND READABLE STORAGE MEDIUM" filed on Oct. 26, 2020, which claims priority to Chinese Patent Application No. 202010041052.9, filed with the State Intellectual Property Office of the People's Republic of China on Jan. 15, 2020, and entitled "VIRTUAL OBJECT CONTROL METHOD AND APPARATUS, DEVICE, AND READABLE STORAGE MEDIUM", all of which are incorporated herein by reference in their entirety.

FIELD OF THE TECHNOLOGY

This application relates to the field of virtual environments, and in particular, to a virtual object control method and apparatus, a terminal, and a readable storage medium.

BACKGROUND OF THE DISCLOSURE

In an application program including a virtual environment, a target virtual object in the virtual environment usually needs to be controlled to move in the virtual environment, for example, walking, running, cycling, climbing, and driving a vehicle.

In the related art, the virtual environment includes a hostile virtual object, and the hostile virtual object moves in the virtual environment. When the hostile virtual object is close to the target virtual object, the hostile virtual object attacks the target virtual object. The player can control the target virtual object to move, and control the target virtual object to battle against the hostile virtual object while maintaining a distance between the target virtual object and the hostile virtual object.

However, in a process that the target virtual object moves while battling against the hostile virtual object, control of the player to the target virtual object will be affected by the hostile virtual object, which causes low human-computer interaction efficiency when the target virtual object moves.

SUMMARY

This application relates to a virtual object control method and apparatus, a device, and a readable storage medium, which can perform a method for determining whether to display a teleportation skill control according to a state of a virtual object, to improve the human-computer interaction efficiency when a target virtual object moves. The technical solutions are as follows:

According to an aspect, a virtual object control method is performed by an electronic device, the method including:

displaying an environment picture, the environment picture being a picture of a virtual environment observed by a target virtual object, the virtual environment including a bonus draw prop, the bonus draw prop being used for providing at least two bonus resources to the target virtual object;

drawing a teleportation skill from the at least two bonus resources in response to the target virtual object being within an interactive distance range of the bonus draw prop;

in accordance with a determination that a skill display condition is met, displaying, on the environment picture, a teleportation skill control used for triggering the teleportation skill; and moving the target virtual object from a first position to a second position in response to receiving a trigger operation for the teleportation skill control, the first position being a position of the target virtual object in the virtual environment when the trigger operation is received and the second position being a randomly determined position in the virtual environment by the teleportation skill.

According to another aspect, a virtual object control apparatus is provided, including:

a display module, configured to display an environment picture, the environment picture being a picture of a virtual environment observed by a target virtual object, the virtual environment including a bonus draw prop, the bonus draw prop being used for providing at least two bonus resources to the target virtual object;

an obtaining module, configured to draw a teleportation skill from the at least two bonus resources in response to the target virtual object being within an interactive distance range of the bonus draw prop, where the display module is configured to display, in the environment picture, a teleportation skill control used for triggering the teleportation skill in accordance with a determination that a skill display condition is met; and a movement module, configured to move the target virtual object from a first position to a second position in response to receiving a trigger operation for the teleportation skill control, the first position being a position of the target virtual object in the virtual environment when the trigger operation is received and the second position being a randomly determined position in the virtual environment by the teleportation skill.

According to another aspect, an electronic device is provided, including a processor and a memory, the memory storing at least one instruction, at least one program, a code set, or an instruction set, the at least one instruction, the at least one program, the code set, or the instruction set being loaded and executed by the processor to cause the electronic device to implement the virtual object control method according to the foregoing embodiments of this application.

According to another aspect, a non-transitory computer-readable storage medium is provided, storing at least one instruction, at least one program, a code set or an instruction set, the at least one instruction, the at least one program, the code set or the instruction set being loaded and executed by a processor of an electronic device to cause the electronic device to implement the virtual object control method according to any one of the foregoing embodiments.

According to another aspect, a computer program product or a computer program is provided, the computer program product or the computer program including computer instructions, the computer instructions being stored in a non-transitory computer-readable storage medium. A processor of a computer device reads the computer instructions from the computer-readable storage medium and executes the computer instructions to cause the computer device to perform the virtual object control method according to any one of the foregoing embodiments. The technical solutions provided in this application produce at least the following beneficial effects:

A teleportation skill is obtained from a bonus draw prop that provides skills to a target virtual object, and a displayed teleportation skill control is operated when a skill display condition is met. The target virtual object can be moved from a first position to a second position through simply operating the teleportation skill control and triggering the teleportation skill. In this way, the human-computer interaction efficiency in a process of controlling the target virtual object to move is improved.

BRIEF DESCRIPTION OF THE DRAWINGS

To describe the technical solutions in the embodiments of this application more clearly, the following briefly introduces the accompanying drawings required for describing the embodiments. Apparently, the accompanying drawings in the following description show only some embodiments of this application, and a person of ordinary skill in the art may still derive other accompanying drawings from these accompanying drawings without creative efforts.

DESCRIPTION OF EMBODIMENTS

To make the objectives, technical solutions, and advantages of this application clearer, implementations of this application are further described below in detail with reference to the accompanying drawings.

First, terms involved in the embodiments of this application are briefly introduced.

A virtual environment is displayed (or provided) by an application program when run on a terminal. The virtual environment may be a simulated environment of a real world, or may be a semi-simulated semi-fictional environment, or may be an entirely fictional environment. The virtual environment may be any one of a two-dimensional virtual environment, a 2.5-dimensional virtual environment, and a three-dimensional (3D) virtual environment. This is not limited in this application. A description is made by using an example in which the virtual environment is a 3D virtual environment in the following embodiments.

Figure 1:
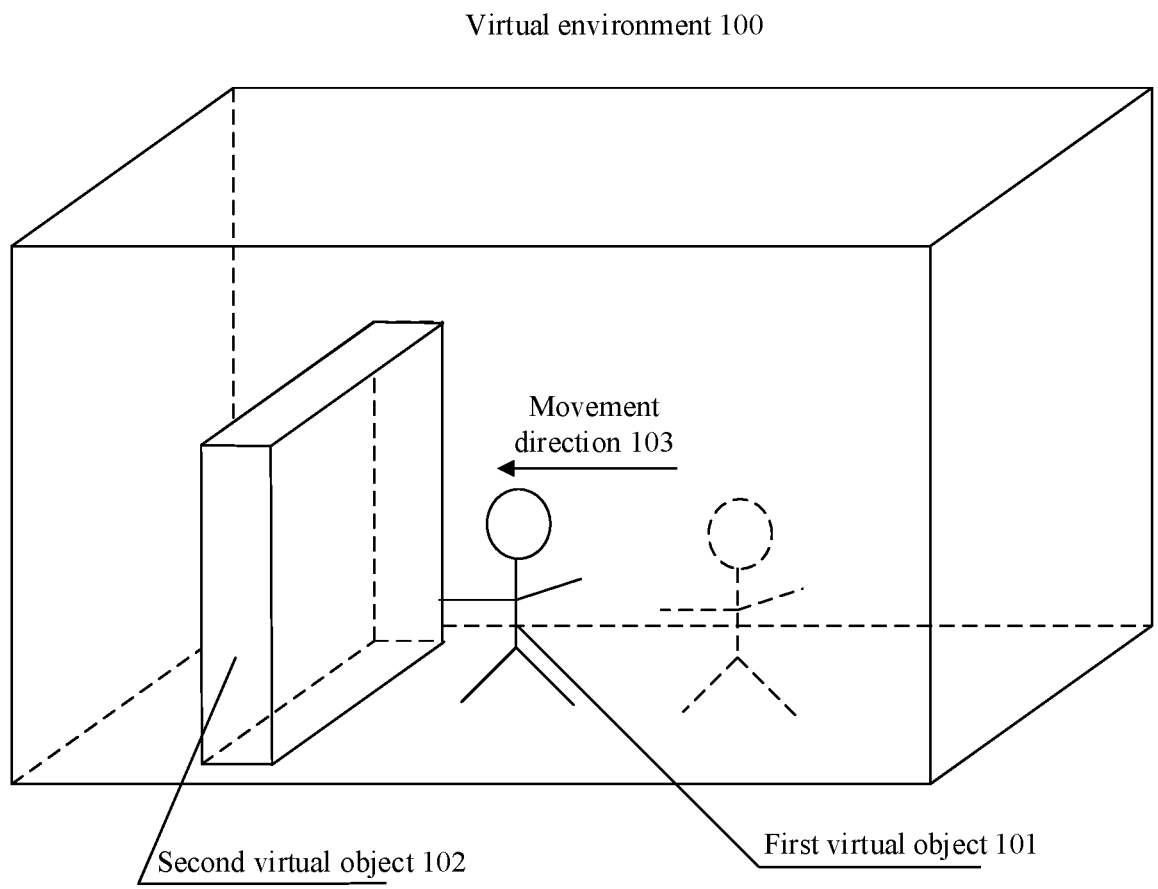
FIG. 1 shows a schematic diagram when virtual objects are in contact according to an exemplary embodiment of this application.

A virtual object is a movable object in a virtual environment. The movable object may be a virtual character, a virtual animal, a cartoon character, or the like, such as a character, an animal, a plant, an oil drum, a wall, a stone, or the like displayed in a 3D virtual environment. In some embodiments, the virtual object is a 3D model created based on a skeletal animation technology. Each virtual object has a respective shape and size in the 3D virtual environment, and occupies some space in the 3D virtual environment. In some embodiments, the virtual object may be controlled by a user to move in the virtual environment, and occupies some space in the 3D virtual environment; or, the virtual object may move in the virtual environment according to a preset movement pattern, and occupies some space in the 3D virtual environment; or, the virtual object is static in the virtual environment, and occupies some space in the 3D virtual environment. In some embodiments, in a process that a first virtual object moves in a movement direction, occupied space thereof is in contact with another virtual object, and the virtual object cannot continuously move in the same movement direction. FIG. 1 shows a schematic diagram when virtual objects are in contact according to an exemplary embodiment of this application. Referring to FIG. 1, a virtual environment 100 includes a first virtual object 101 and a second virtual object 102. The first virtual object 101 is a virtual character controlled in a current terminal, and the second virtual object 102 is a virtual wall that statically exists in the virtual environment 100. The user may control the first virtual object 101 to make the first virtual object 101 move in the virtual environment 100. However, because both the first virtual object 101 and the second virtual object 102 occupy some space in a 3D virtual environment, the user cannot control the first virtual object 101 to make the first virtual object 101 pass through the second virtual object 102 in a process of movement. In this case, the first virtual object 101 needs to move from a first side of the second virtual object 102 to a second side of the second virtual object 102 by bypassing or leaping over the second virtual object 102.

The method provided in this application may be applied to a virtual reality (VR) application, a 3D map application, a military simulation program, a first-person shooting (FPS) game, a third-personal shooting (TPS) game, a multiplayer online battle arena (MOBA) game, and the like. Application in a game is used as an example for description in the following embodiments.

A game based on a virtual environment usually includes maps of one or more game worlds. The virtual environment in the game simulates scenes in the real world. A user may control a virtual object in the game to perform actions in the virtual environment such as walking, running, jumping, shooting, combating, driving, switching to virtual weapons, and using a virtual weapon to attack another virtual object, which has relatively high interactivity. In addition, a plurality of users may form a team online to perform an arena game. In a process of controlling the virtual object, the user can control movement of the virtual object by operating an environment picture.

Figure 2:
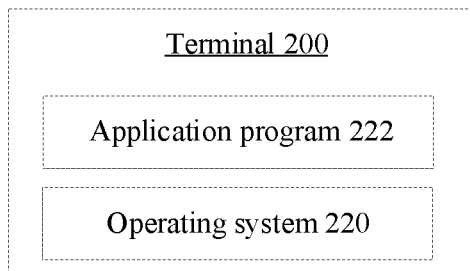
FIG. 2 shows a structural block diagram of an electronic device according to an exemplary embodiment of this application.

FIG. 2 shows a structural block diagram of an electronic device according to an exemplary embodiment of this application. An electronic device 200 includes an operating system 220 and an application program 222.

The operating system 220 is basic software provided for the application program 222 to perform secure access to computer hardware.

The application program 222 is an application program supporting a virtual environment. In some embodiments, the application program 222 is an application program supporting a virtual environment. The application program 222 may be any one of a virtual reality application program, a 3D map program, a military simulated program, a TPS game, an FPS game, an MOBA game, and a multi-player shootout survival game. The application program 222 may be a standalone application program, such as a standalone 3D game program.

Figure 3:
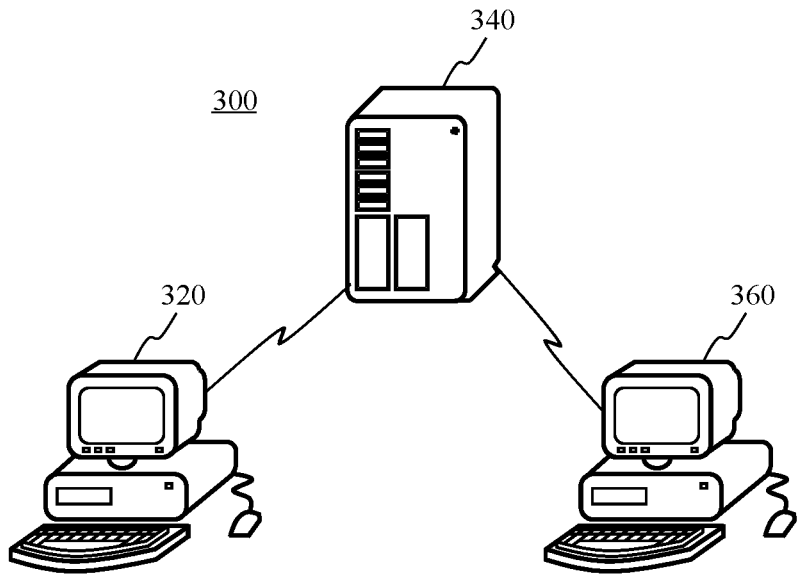
FIG. 3 shows a structural block diagram of a computer system according to an exemplary embodiment of this application.

FIG. 3 shows a structural block diagram of a computer system according to an exemplary embodiment of this application. A computer system 300 includes a first device 320, a server 340, and a second device 360.

An application program supporting a virtual environment is installed and run on the first device 320. The application program may be any one of a virtual reality application program, a 3D map program, a military simulation program, a TPS game, an FPS game, an MOBA game, and a multi-player shooting survival game. The first device 320 is a device used by a first user. The first user uses the first device 320 to control a first virtual object in the virtual environment to perform an action. The action includes, but is not limited to, at least one of body posture adjustment, crawling, walking, running, cycling, jumping, driving, picking, shooting, attacking, and throwing. Exemplarily, the first virtual object is a first virtual character such as a simulated character role or a cartoon character role.

The first device 320 is connected to the server 340 by using a wireless network or a wired network.

The server 340 includes at least one of one server, a plurality of servers, a cloud computing platform, and a virtualization center. The server 340 is configured to provide a backend service for an application program supporting a 3D virtual environment. In some embodiments, the server 340 is responsible for primary computing work, and the first device 320 and the second device 360 are responsible for secondary computing work. Alternatively, the server 340 is responsible for secondary computing work, and the first device 320 and the second device 360 are responsible for primary computing work. Alternatively, the server 340, the first device 320, and the second device 360 perform collaborative computing by using a distributed computing architecture among each other.

An application program supporting a virtual environment is installed and run on the second device 360. The application program may be any one of a VR application program, a 3D map program, a military simulation program, an FPS game, a MOBA game, and a multiplayer gunfight survival game. The second device 360 is a device used by a second user, the second user uses the second device 360 to control a second virtual object in the virtual environment to move, and the movement includes, but is not limited to, at least one of body posture adjustment, crawling, walking, running, cycling, jumping, driving, picking, shooting, attacking, and throwing. Exemplarily, the second virtual object is a second virtual character, such as a simulated character role or a cartoon character role.

In some embodiments, the first virtual character and the second virtual character are located in the same virtual environment. In some embodiments, the first virtual character and the second virtual character may belong to the same team or the same organization, have a friend relationship, or have a temporary communication permission. In some embodiments, the first virtual character and the second virtual character may alternatively belong to different teams, different organizations, or two groups hostile to each other.

In some embodiments, the application programs mounted on the first device 320 and the second device 360 are the same, or the application programs mounted on the two devices are the same type of application programs of different control system platforms. The first device 320 may generally refer to one of a plurality of devices, the second device 360 may generally refer to one of a plurality of devices, and in this embodiment, description is made by using only the first device 320 and the second device 360 as an example. The type of the first device 320 and the type of the second device 360 may be the same or may be different. The device type includes at least one of a game console, a desktop computer, a smartphone, a tablet computer, an e-book reader, an MP3 player, an MP4 player, and a laptop computer. In the following embodiments, description is made by using an example in which the device is a desktop computer.

A person skilled in the art may learn that there may be more or fewer devices. For example, there may be only one device, or there may be dozens of or hundreds of or more devices. The quantity and the device type of the device are not limited in the embodiments of this application.

Figure 4:
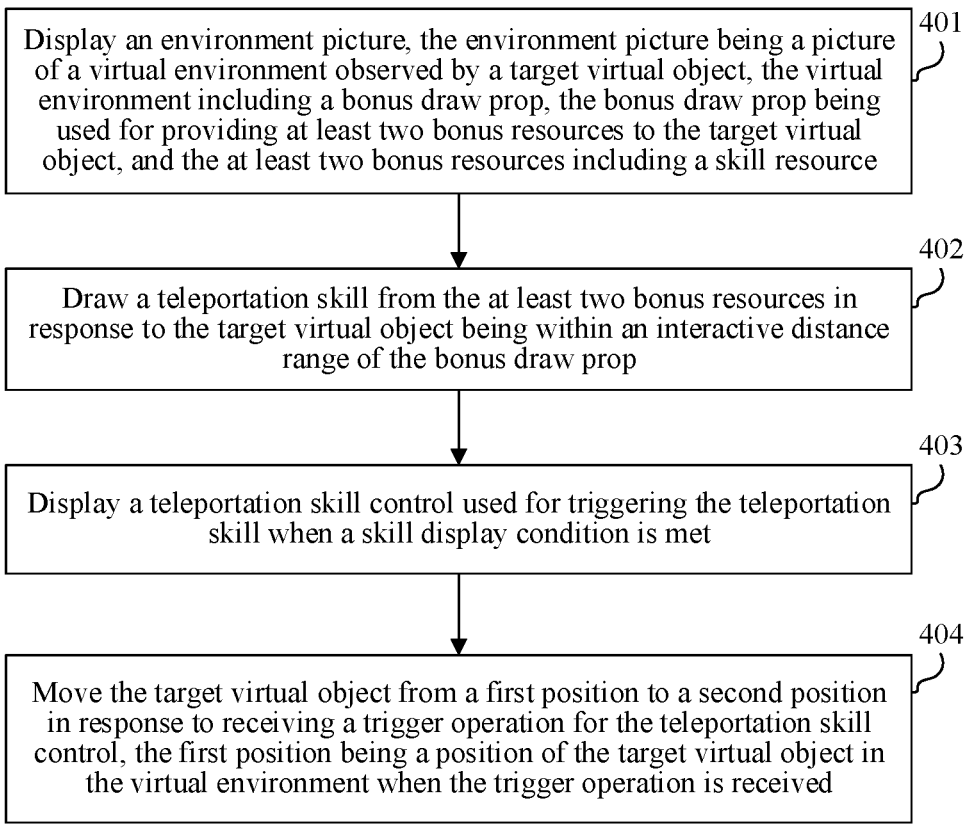
FIG. 4 shows a flowchart of a virtual object control method in a virtual environment according to an exemplary embodiment of this application.

With reference to the term introductions and implementation environment descriptions, the virtual object control method in a virtual environment provided in an embodiment of this application is described. FIG. 4 shows a flowchart of a virtual object control method in a virtual environment according to an exemplary embodiment of this application. The method being applicable to an electronic device is used as an example for description, and the method includes the following steps:

Step 401: Display an environment picture, the environment picture being a picture of a virtual environment observed by a target virtual object, the virtual environment including a bonus draw prop, the bonus draw prop being used for providing at least two bonus resources to the target virtual object. In some embodiments, the at least two bonus resources include a skill resource. In some embodiments, the two bonus resources are of the same type or different types including, e.g., one skill type and one prop type, etc.

In this embodiment of this application, the electronic device is specifically implemented as a terminal. The terminal has a display screen, and the display screen may display an environment picture. In some embodiments, the environment picture includes a picture that the virtual environment is observed from a first-person perspective of the target virtual object; or, the environment picture includes a picture that the virtual environment is observed from a third-person perspective of the target virtual object. In some embodiments, the environment picture includes a scene of a virtual battle observed by the target virtual object.

In this embodiment of this application, the environment picture is a picture displayed in a virtual environment interface. In the virtual environment interface, a control for controlling the target virtual object may be superimposed and displayed in the environment picture.

When the environment picture is the scene of the virtual battle observed by the virtual character, the virtual battle includes a single-player battle mode and a team battle mode. In some embodiments, when the virtual battle is the single-player battle mode, other virtual objects in the virtual battle are enemy virtual objects of the virtual object. In some embodiments, when the virtual battle is the team battle mode, the virtual battle includes teammate virtual objects and enemy virtual objects of the virtual object, or the virtual battle only includes enemy virtual objects of the virtual object.

In some embodiments, events that may be generated among virtual objects include: an injury event and an elimination event. The injury event includes an event in which the target virtual object causes damage to another virtual object, or an event in which another virtual object causes damage to the target virtual object. The elimination event means that a virtual object is eliminated when meeting an eliminated condition. In an example, when damage suffered by the target virtual object reaches a damage quantity threshold, the target virtual object is eliminated in the virtual battle.

The virtual environment includes the bonus draw prop. In some embodiments, the bonus draw prop is a bonus box disposed in the virtual environment when the virtual battle starts, and provides bonus resources to the target virtual object. Alternatively, the bonus draw prop is a bonus box generated in the virtual environment after the target virtual object finishes a preset task, and provides the bonus resources to the target virtual object. Alternatively, the bonus draw prop is the bonus box disposed in the virtual environment when the virtual battle starts, and the target virtual object needs to finish a task to obtain a chance of drawing bonus resource from the bonus box. The method for setting the bonus draw prop is not limited in this embodiment of this application.

In an example, the bonus resources include skills and props. In some embodiments, the target virtual object may obtain a skill from the bonus draw prop, or the target virtual object may obtain a prop from the bonus draw prop. After the skill is obtained, the target virtual object may use the obtained skill. In some embodiments, when a trigger operation for a skill control in the environment picture is received, the target virtual object may use the obtained skill. Alternatively, when a skill usage condition is met, the target virtual object may use automatically use the skill. In some embodiments, a usage number of the skill by the target virtual object is limited, and after the target virtual object uses the skill once, it needs to wait for a time interval period of skill usage before the same skill may be used repeatedly.

The trigger operation related in this application may be at least one of a touch trigger operation, a physical key trigger operation, a shortcut key trigger operation, a voice input trigger operation, a gesture trigger operation, and a somatosensory trigger operation. The trigger operation being implemented as a touch trigger operation in this application is used as an example for description. In an example, the interface includes a moving control, and a touch operation for the moving control is used as the trigger operation, so that the target virtual object performs movement corresponding to the operation.

Figure 5:
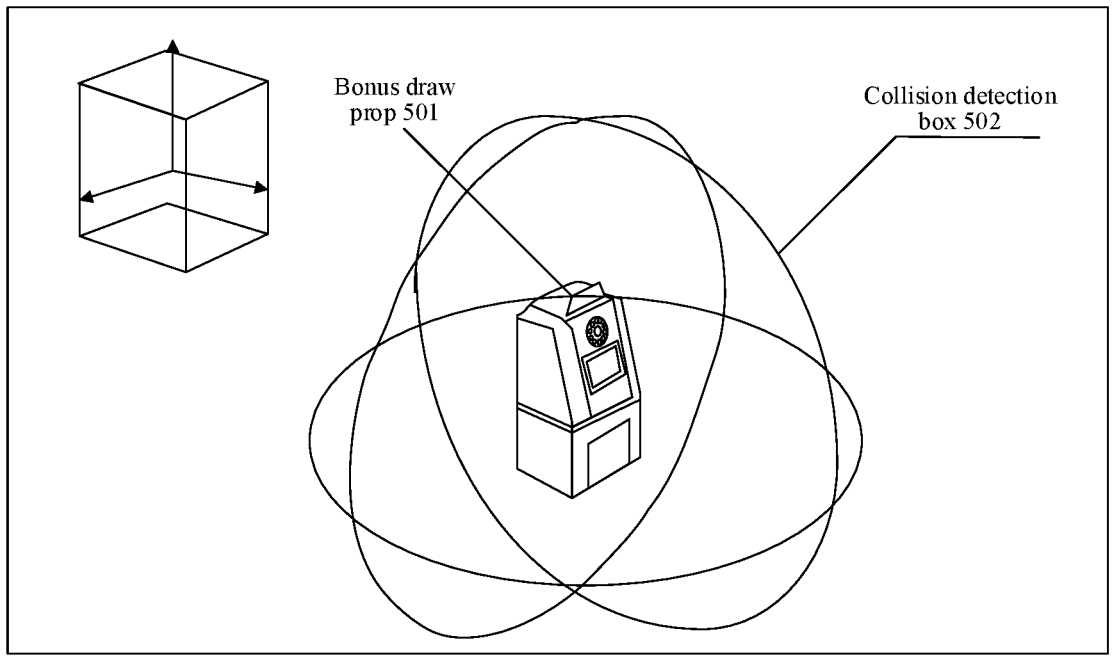
FIG. 5 shows a schematic diagram of a collision detection box corresponding to a bonus draw prop according to an exemplary embodiment of this application.

Step 402: Draw a teleportation skill from the at least two bonus resources in response to the target virtual object being within an interactive distance range of the bonus draw prop;

In some embodiments, the bonus draw prop corresponds to a collision detection box. FIG. 5 shows a schematic diagram of a collision detection box corresponding to a bonus draw prop according to an exemplary embodiment of this application. In some embodiments, an outer ring of a bonus draw prop 501 includes a collision detection box 502, and the collision detection box 502 is invisible in the virtual environment.

In some embodiments, collision detection is performed between the target virtual object and the bonus draw prop 501 by using the collision detection box. When a collision condition is detected between the target virtual object and the bonus draw prop 501, it is determined that the target virtual object is in the interactive distance range of the bonus draw prop 501.

In some embodiments, the teleportation skill is at least one of skills included in the bonus draw prop. The target virtual object may at least once obtain a skill from the bonus draw prop. In an example, the bonus draw prop includes at least one skill. In this case, each time the target virtual object is determined to be in the interactive distance range of the bonus draw prop, the virtual environment interface may display a bonus extraction control, and in response to receiving a trigger operation for the bonus extraction control, the target virtual object may obtain a bonus resource from the bonus draw prop. In some embodiments, a skill may be repeatedly obtained many times from the bonus draw prop. In this case, each time the skill is repeatedly obtained, a usage number of the skill may be improved.

In some embodiments, the bonus resource obtained by the target virtual object from the bonus draw prop includes the teleportation skill.

Step 403: Display, when a skill display condition is met, a teleportation skill control used for triggering the teleportation skill.

In some embodiments, before the skill display condition is met, the virtual environment interface does not include the teleportation skill control, and only when the skill display condition is met, the teleportation skill control is generated in the virtual environment interface. Alternatively, when the teleportation skill is obtained from the bonus draw prop, an icon indicating that the teleportation skill is currently unavailable is displayed. In response to meeting the skill display condition, the teleportation skill control associated with the icon is generated according to the position of the icon, and indicates that the teleportation skill is available. In an example, when the teleportation skill is obtained from the bonus draw prop, a gray teleportation skill icon corresponding to the teleportation skill is displayed. In response to meeting the skill display condition, a blue icon that has the same shape as the gray icon and replaces the gray icon is generated at a position of the gray icon as the teleportation skill control.

In some embodiments, the skill display condition indicates a condition that the target virtual object may use the teleportation skill. The skill display condition is related to a state of the target virtual object, or the skill display condition is related to the virtual environment. In some embodiments, a quantity of skill display conditions is at least one. In this embodiment, the quantity of skill display conditions being one is described. When the quantity of skill display conditions is one and the skill display condition is a state condition related to the state of the target virtual object, it is determined whether the teleportation skill control is displayed through the state of the target virtual object. When the quantity of skill display conditions is one and the skill display condition is an environmental condition related to the virtual environment, it is determined whether the teleportation skill control is displayed through environmental states of subregions in the virtual environment.

Step 404: Move the target virtual object from a first position to a second position in response to receiving a trigger operation for the teleportation skill control, the first position being a position of the target virtual object when the trigger operation is received.

In some embodiments, the movement of the target virtual object from the first position to the second position may be continuous movement of the target virtual object from the first position to the second position, or discontinuous movement of the target virtual object jumping from the first position to the second position.

In some embodiments, the first position and the second position are two different positions in the virtual environment. In some embodiments, the second position is a position that a distance between the second position and the first position is greater than a distance threshold preset by the terminal, or a distance between the second position and any hostile virtual object in the virtual environment is greater than the distance threshold preset by the terminal.

In some embodiments, the second position may be a designated position received by the terminal, or a random position selected in the virtual environment.

In conclusion, according to the method provided in this embodiment, a teleportation skill is obtained from a bonus draw prop that provides skills to a target virtual object, and a displayed teleportation skill control is operated when a skill display condition is met. The target virtual object can be moved from a first position to a second position through simply operating the teleportation skill control. In this way, the human-computer interaction efficiency in a process of controlling the target virtual object to move is improved.

Figure 6:
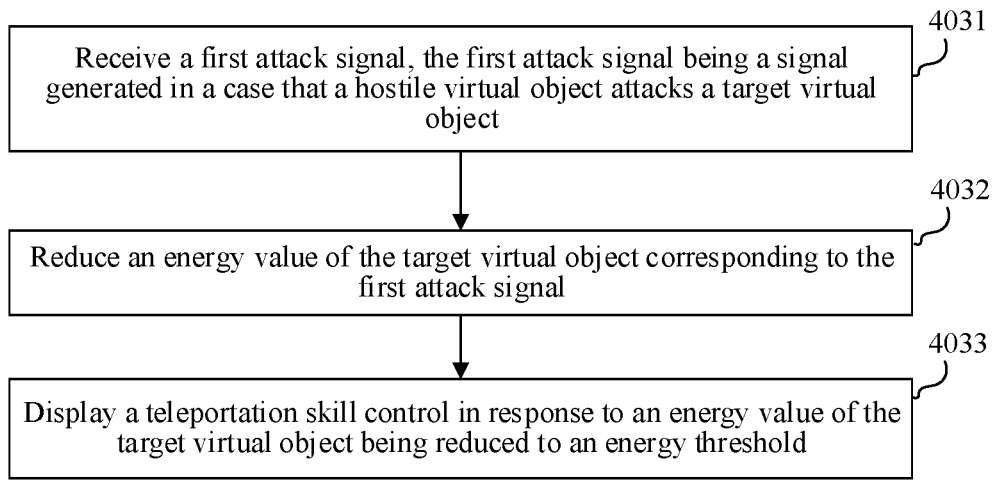
FIG. 6 shows a flowchart of an operating method for a virtual prop in a virtual environment according to another exemplary embodiment of this application.

In some embodiments, the skill display condition includes a state condition of the target virtual object. Based on the embodiment shown in FIG. 4, FIG. 6 shows a flowchart of an operating method for a virtual prop in a virtual environment according to another exemplary embodiment of this application. In this embodiment, step 403 in the embodiment shown in FIG. 4 is replaced with steps 4031 to 4033. The method being applicable to an electronic device is used as an example for description, and the method includes:

Step 4031: Receive a first attack signal, the first attack signal being a signal generated when a hostile virtual object attacks the target virtual object.

In this embodiment, the virtual environment further includes the hostile virtual object, the hostile virtual object is a virtual object that attacks the target virtual object.

In some embodiments, the attack of the hostile virtual object to the target virtual object includes an invalid attack and a valid attack. When the hostile virtual object generates the valid attack to the target virtual object, the first attack signal is generated. In some embodiments, the first attack signal includes a value, the target virtual object corresponds to an energy value, and the value affects a parameter corresponding to the target virtual object.

Step 4032: Reduce the energy value of the target virtual object corresponding to the first attack signal.

As described in step 4031, the parameter corresponding to the target virtual object includes the energy value of the target virtual object. In some embodiments, the value included in the first attack signal affects the energy value of the target virtual object, and the energy value of the target virtual object is lower than a value equal to the first attack signal, or the energy value of the target virtual object is lower than a value corresponding to the first attack signal. The value is calculated by the value of the first attack signal.

In some embodiments, the energy value includes an energy value corresponding to the target virtual object, or an energy value corresponding to a prop of the target virtual object. In an example, the energy value corresponding to the target virtual object is a hit point value of the target virtual object, or a magic value of the target virtual object, or an attribute value of the target virtual object. In another example, the energy value corresponding to the target virtual object is an endurance value of a virtual shield of the target virtual object, or an amount of remaining ammunition of a virtual weapon of the target virtual object.

Step 4033: Display the teleportation skill control in response to the energy value of the target virtual object being reduced to an energy threshold.

In this embodiment, the energy threshold is a maximum value of the energy value corresponding to the target virtual object when displaying the teleportation skill control.

In some embodiments, the energy value is represented in an environment picture in different manners. In an example, the environment picture correspondingly displays the energy value of the target virtual object in a value manner.

In another example, the environment picture does not display the energy value. When the target virtual object is attacked, brightness or color of the virtual environment interface changes to prompt that the target virtual object is attacked, or prompt the energy value of the target virtual object. For example, when the energy value of the target virtual object is reduced, the brightness of the virtual environment interface is reduced; and when the energy value of the target virtual object is increased, the virtual environment interface is increased.

In some embodiments, when the energy value is reduced to the energy threshold, the teleportation skill control is displayed in the virtual environment interface. In some embodiments, when the energy value is recovered to being greater than the energy threshold, the teleportation skill control disappears; or, after the energy value is initially reduced to the energy threshold, the teleportation skill control is always displayed in the virtual environment interface.

In some embodiments, when the energy value of the target virtual object is reduced to zero, the target virtual object is eliminated, and the teleportation skill control cannot be displayed in the virtual environment interface.

In conclusion, according to the method provided in this embodiment, a first attack signal is generated by a hostile virtual object attacking a target virtual object, an energy value of the target virtual object is correspondingly reduced according to the first attack signal, and a teleportation skill control is displayed in response to the energy value being reduced to an energy threshold. This application performs a method for determining whether to display a teleportation skill control according to the state of a virtual object, which improves the movement efficiency of the target virtual object when the energy value is low.

Figure 7:
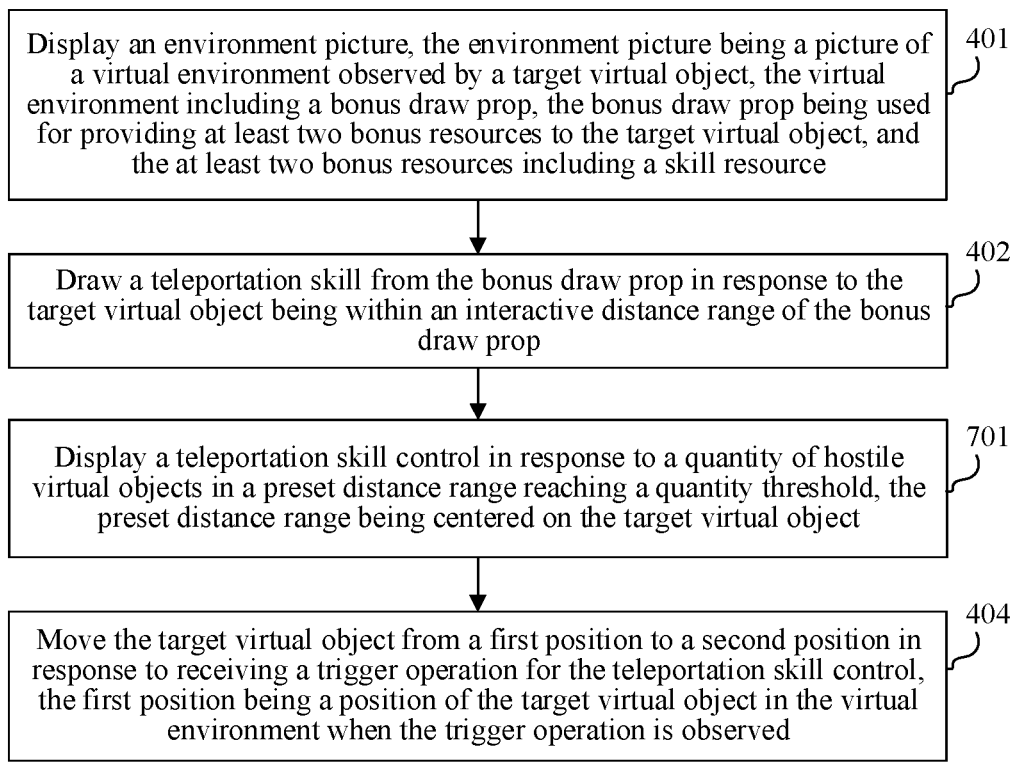
FIG. 7 shows a flowchart of an operating method for a virtual prop in a virtual environment according to another exemplary embodiment of this application.

In some embodiments, the skill display condition includes an environmental condition corresponding to the virtual environment. Based on the embodiment shown in FIG. 4, FIG. 7 shows a flowchart of an operating method for a virtual prop in a virtual environment according to another exemplary embodiment of this application. In this embodiment, step 403 in the embodiment shown in FIG. 4 is replaced with step 701. The method being applicable to an electronic device is used as an example for description, and the method includes:

Step 701: Display the teleportation skill control in response to a quantity of hostile virtual objects in a preset distance range reaching the quantity threshold, the preset distance range being centered on the target virtual object.

In this embodiment, the electronic device is implemented as a terminal.

As described above, the skill display condition includes an environmental condition, and the environmental condition is used for indicating that a quantity of hostile virtual objects in a subregion of the virtual environment is greater than a quantity threshold.

In some embodiments, the subregion of the virtual environment is obtained by dividing the virtual environment according to a position of the target virtual object. In this embodiment, the subregion of the virtual environment is centered on the target virtual object, and a preset length is a radius of a spherical area range. When parts of hostile virtual objects enter the spherical area range, the hostile virtual objects are considered as being in the subregion of the virtual environment. In some embodiments, a position of the subregion of the virtual environment is changed with the position of the target virtual object.

In some embodiments, the quantity of virtual objects is determined by setting the quantity threshold. In an example, the quantity of hostile virtual objects in the subregion of the virtual environment being in a value range is used as the environmental condition. When the quantity of hostile virtual objects in the subregion of the virtual environment is ten and the quantity threshold of hostile virtual objects is eight, it may be determined that the quantity of hostile virtual objects in the subregion of the virtual environment reaches the quantity threshold, and the teleportation skill control is displayed.

In conclusion, according to the method provided in this embodiment, a quantity of hostile virtual objects in a subregion of a virtual environment is counted, and a teleportation skill control is displayed in response to the quantity reaching a quantity threshold. It is determined whether to display the teleportation skill control according to the quantity of hostile virtual objects in the subregion, which improves the human-computer interaction efficiency when controlling the target virtual object while there are a plurality of hostile virtual objects around.

Figure 8:
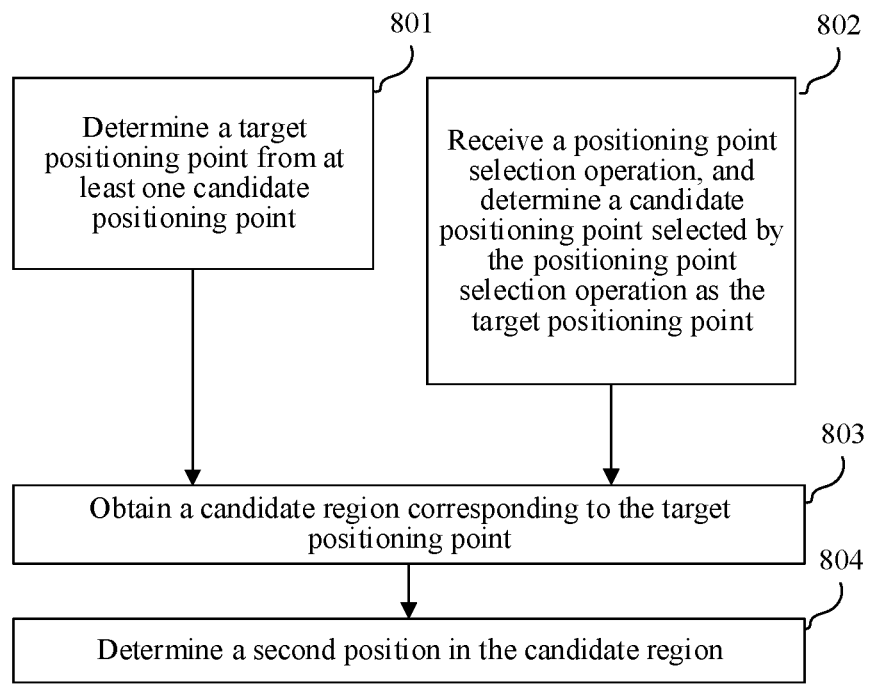
FIG. 8 shows a flowchart of a method for determining a second position according to an exemplary embodiment of this application.

In some embodiments, when the skill display condition is met, the teleportation skill control is displayed. After the skill trigger operation is received, a second position needs to be determined, to finish a movement control for the target virtual object. FIG. 8 shows a flowchart of a method for determining a second position according to an exemplary embodiment of this application. In some embodiments, the method shown in FIG. 8 may replace and be implemented as step 404 shown in FIG. 4, and be implemented after responding to receiving the trigger operation for the teleportation skill control. The method being applicable to an electronic device is used as an example for description, and the method includes:

Step 801: Randomly determine a target positioning point from at least one candidate positioning point.

In this embodiment, the electronic device is implemented as a terminal.

Figure 9:
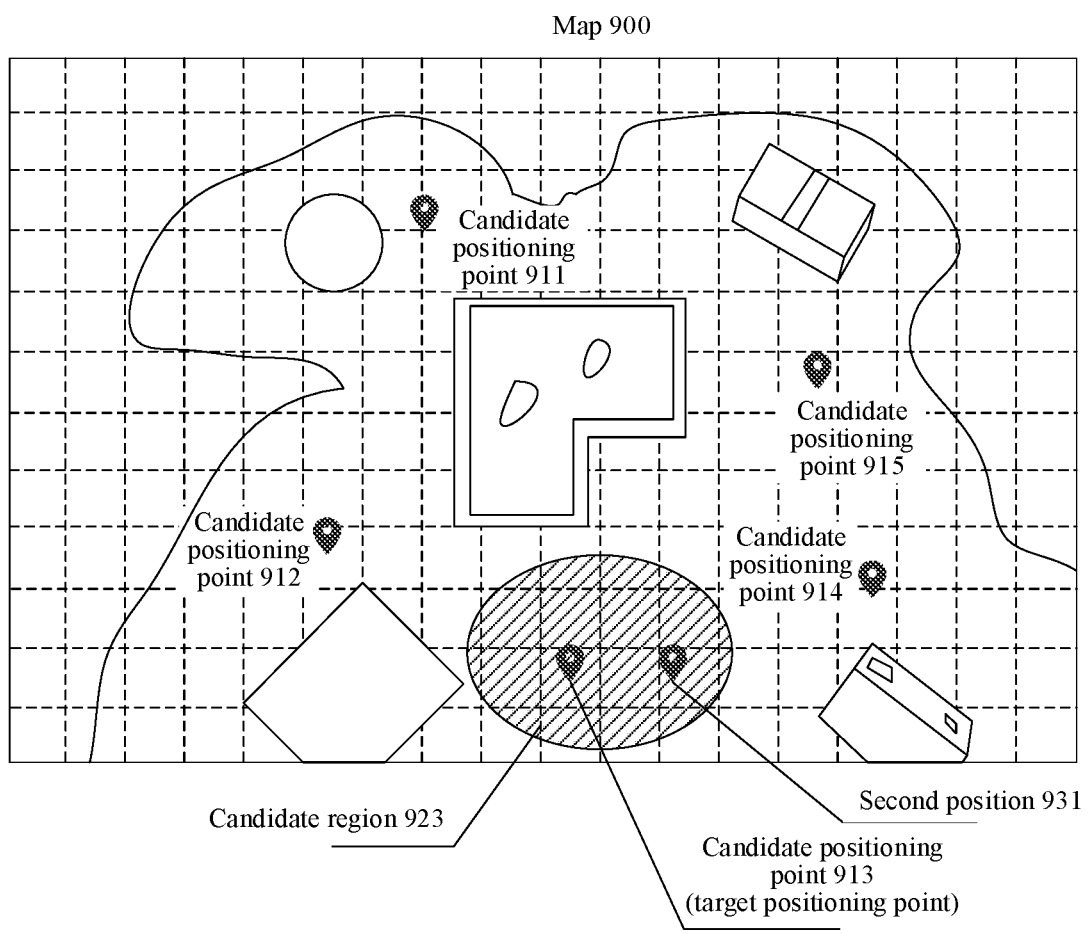
FIG. 9 shows a schematic diagram of a virtual map according to an exemplary embodiment of this application.

A map shown in this embodiment is a virtual map generated according to the virtual environment. FIG. 9 shows a schematic diagram of a virtual map according to an exemplary embodiment of this application. Referring to FIG. 9, there are five candidate positioning points disposed by the terminal. In some embodiments, candidate positioning points 911 to 915 are disposed in a virtual map 900.

Referring to FIG. 9, in the embodiment shown in FIG. 9, the candidate positioning point 913 is determined as the target positioning point through random selection of the terminal.

In some embodiments, in another embodiment, step 801 may be replaced with step 802.

Step 802: Receive a positioning point selection operation, and use a candidate positioning point selected by the positioning point selection operation as a target positioning point.

In some embodiments, in this embodiment, the target positioning point corresponds to a target positioning point selection control, and when the positioning point selection control is operated, the terminal may receive the positioning point selection operation. Referring to FIG. 9, in the embodiment shown in FIG. 9, in response to receiving the positioning point selection operation, the candidate positioning point 913 is determined as the target positioning point.

Step 803: Obtain a candidate region corresponding to the target positioning point.

In some embodiments, the candidate region corresponding to the target positioning point is determined according to the target positioning point generated randomly and a determining rule preset in the terminal. Referring to FIG. 9, in the embodiment shown in FIG. 9, after the candidate positioning point 913 is selected, a candidate region 923 is obtained according to the candidate positioning point 913.

Step 804: Determine a second position in the candidate region.

In some embodiments, a position is randomly determined as the second position within the candidate region. Referring to FIG. 9, in the embodiment shown in FIG. 9, after the candidate region 923 is determined, a second position 931 is randomly determined in the candidate region 923.

In conclusion, according to the method provided in this embodiment, candidate positioning points are randomly generated in a map, a target positioning point and a corresponding candidate region are obtained from the candidate positioning points, and a second position is determined from the candidate region, which increase randomness of human-computer interaction when a target virtual object moves through a teleportation skill.

Figure 10:
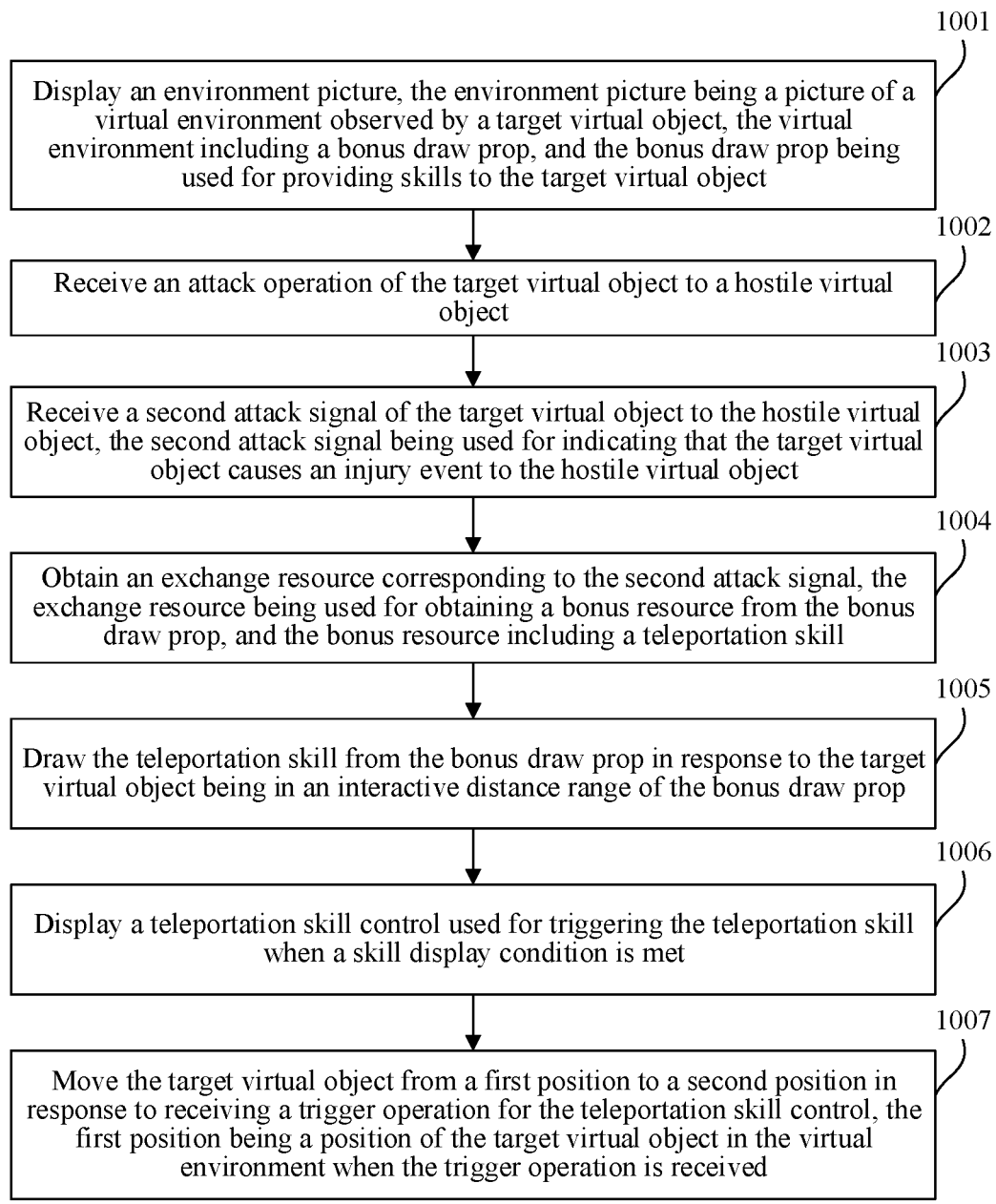
FIG. 10 shows a schematic diagram of a virtual object control method in a virtual environment according to an exemplary embodiment of this application.

FIG. 10 shows a schematic diagram of a virtual object control method in a virtual environment according to an exemplary embodiment of this application. The method being applicable to an electronic device is used as an example for description, and the method includes:

Step 1001: Display an environment picture, the environment picture being a picture of a virtual environment observed by a target virtual object, the virtual environment including a bonus draw prop, and the bonus draw prop being used for providing skills to the target virtual object.

In some embodiments, in this embodiment, in a process of drawing a skill from the bonus draw prop and providing a corresponding role to the target virtual object, an exchange resource needs to be consumed. In an example, the target virtual object obtains game currency through a battle against a hostile virtual object, and the game currency may be used as the exchange resource.

Step 1002: Receive an attack operation of the target virtual object to a hostile virtual object.

In some embodiments, the target virtual object performs the attack operation to the hostile virtual object through a battle against the hostile virtual object. In some embodiments, the battle includes a battle using an attack prop. The attack prop refers to a prop of a virtual object in a virtual environment that is used for attacking another virtual object, where the other virtual object may only be implemented as a virtual object in a hostile state with the virtual object. Alternatively, the object may be implemented as the virtual object in a hostile state with the target virtual object, or may be implemented as a virtual object in a teammate state with the target virtual object. In this embodiment, the other virtual object being the hostile virtual object of the target virtual object is used as an example.

In some embodiments, the attack prop may alternatively be divided into a long-range attack prop and a short-range attack prop. The long-range attack prop refers to a prop that achieves an attack process by launching a projectile, where the projectile may be launched through a prop body, such as: a virtual firearm, or a virtual bow and arrow, or may be implemented as an attack prop itself, such as: a stone, or a sandbag. The short-range attack prop refers to a prop that is directly controlled by a virtual object be means of swing to achieve an attack process, such as: a virtual knife, a virtual stick, or a virtual pan.

In some embodiments, a virtual environment interface includes an attack control of the target virtual object, and in response to a trigger operation for the attack control, the terminal receives the attack operation of the target virtual object to the hostile virtual object. In some embodiments, the target virtual object attacks the hostile virtual object according to the attack operation and the attack prop of the target virtual object. For example, the target virtual object attacks the hostile virtual object through a virtual firearm thereof.

Step 1003: Receive a second attack signal of the target virtual object to the hostile virtual object, the second attack signal being used for indicating that the target virtual object causes an injury event to the hostile virtual object.

In some embodiments, when the target virtual object hits the hostile virtual object through the attack prop thereof, it is determined that the target virtual object causes the injury event to the hostile virtual object, and the second attack signal of the target virtual object to the hostile virtual object is generated according to the injury event. In an example, the attack prop of the target virtual object includes the virtual firearm, and the target virtual object attacks the hostile virtual object through the virtual firearm. When a virtual bullet fired by the virtual firearm passes through a 3D space occupied by the hostile virtual object, it is determined that the target virtual object causes the injury event to the hostile virtual object, and the second attack signal is generated according to the attack of the virtual firearm.

Step 1004: Obtain an exchange resource corresponding to the second attack signal, the exchange resource being used for drawing a bonus resource from the bonus draw prop, and the bonus resource including a teleportation skill.

Figure 11:
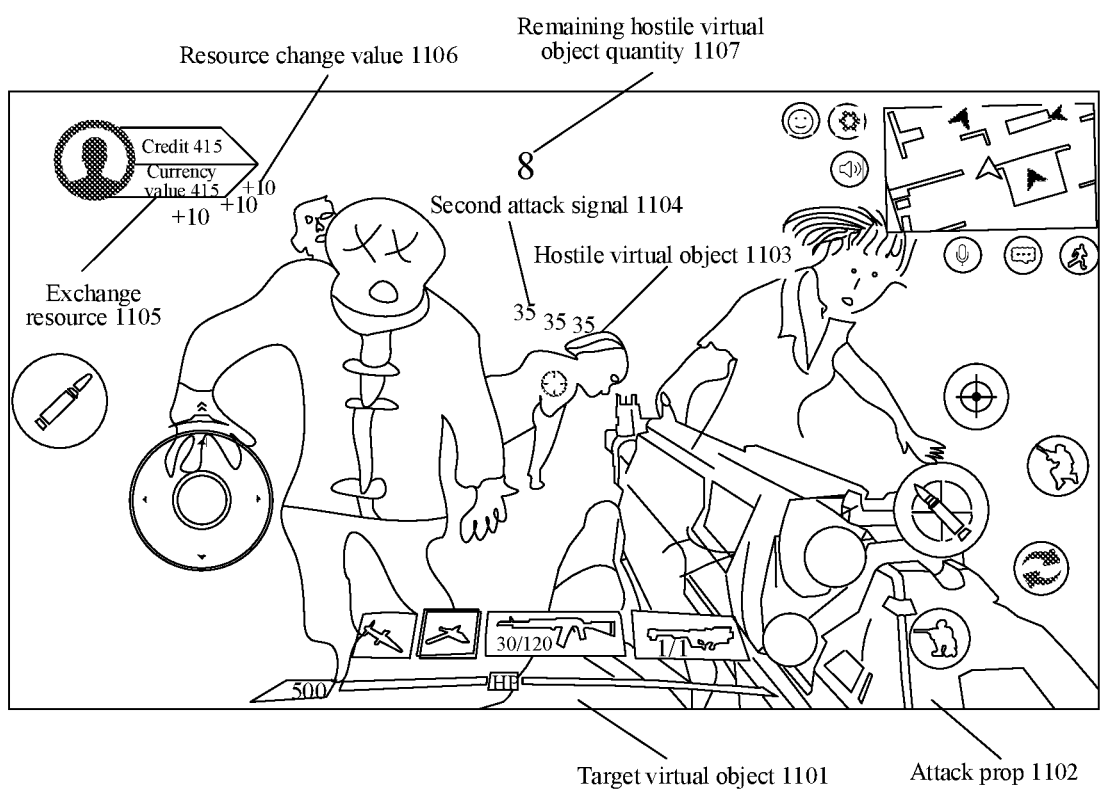
FIG. 11 shows a schematic diagram of a target virtual object obtaining a bonus through attacking a hostile virtual object according to an exemplary embodiment of this application.

FIG. 11 shows a schematic diagram of a target virtual object obtaining a bonus through attacking a hostile virtual object according to an exemplary embodiment of this application. Referring to FIG. 11, a target virtual object 1101 attacks a hostile virtual object 1103 through an attack prop 1102, and a second attack signal 1104 is generated. The second attack signal is represented in the environment picture with a value form. When the second attack signal 1104 is generated, an exchange resource 1105 is correspondingly obtained according to the second signal 1104. In some embodiments, when exchange resource 1105 changes, an exchange resource change value 1106 is represented with a value form corresponding to the second attack signal 1104 in the environment picture.

In some embodiments, the hostile virtual object is provided with a signal threshold. When a sum of attack signals for a single virtual object exceeds the signal threshold, the hostile virtual object is eliminated. When the hostile virtual object is eliminated, the target virtual object may alternatively obtain the exchange resource correspondingly. The environment picture further includes a remaining hostile virtual object quantity 1107.

Step 1005: Draw the teleportation skill from the bonus draw prop, in response to the target virtual object being within an interactive distance range of the bonus draw prop.

In some embodiments, when a collision detection box corresponding to the bonus draw prop is performed for collision detection and it is determined that the target virtual object is in the interactive range of the bonus draw prop, an environment picture for obtaining a skill from the bonus draw prop is displayed.

Figure 12:
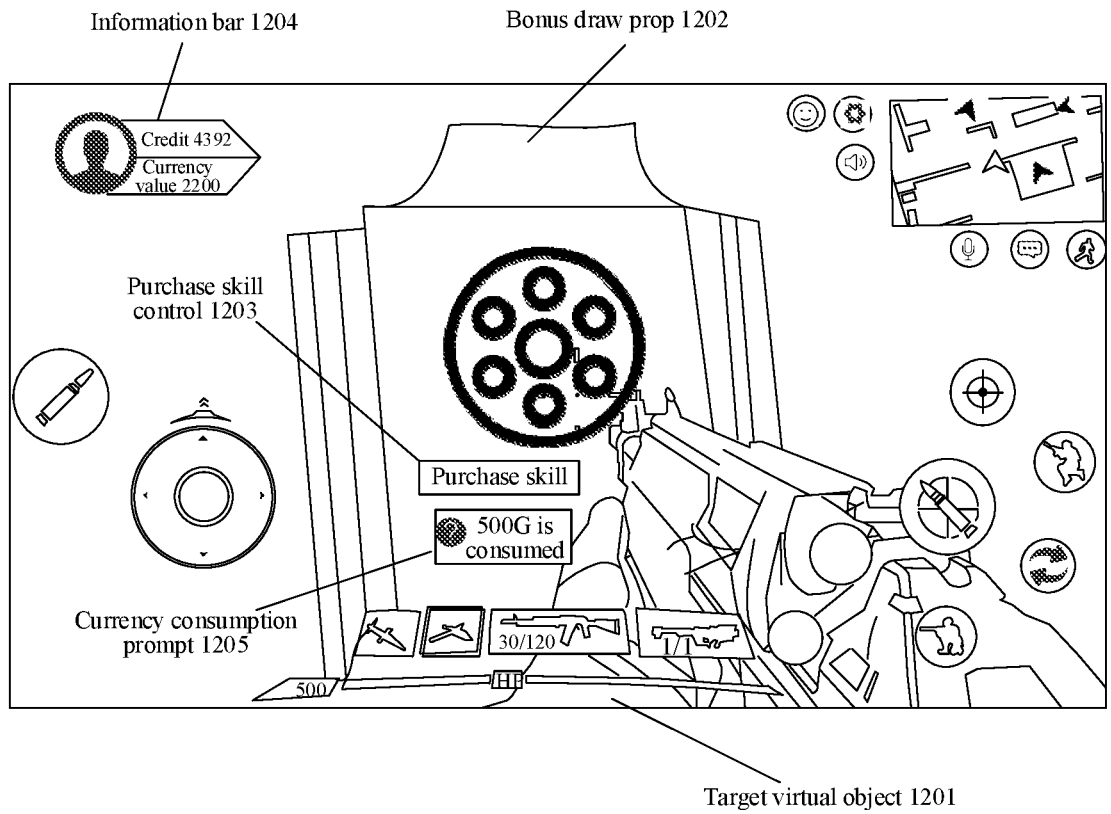
FIG. 12 shows a schematic diagram of a virtual environment interface of obtaining a skill from a bonus draw prop according to an exemplary embodiment of this application.

FIG. 12 shows a schematic diagram of a virtual environment interface of obtaining a skill from a bonus draw prop according to an exemplary embodiment of this application. Referring to FIG. 12, the virtual environment interface includes a target virtual object 1201, a bonus draw prop 1202, and a purchase skill control 1203. In some embodiments, the interface further includes an information bar 1204 of the target virtual object. A quantity of exchange resources of the target virtual object is displayed in the information bar. In FIG. 12, the quantity of exchange resources is expressed in a form of a currency value. In some embodiments, the interface further includes a currency consumption prompt 1205, used for prompting a currency value that needs to be consumed to purchase a skill this time. In some embodiments, when a purchase skill trigger operation is received through the purchase skill control 1203, the target virtual object may consume corresponding currency, and randomly obtain at least one skill.

Figure 13:
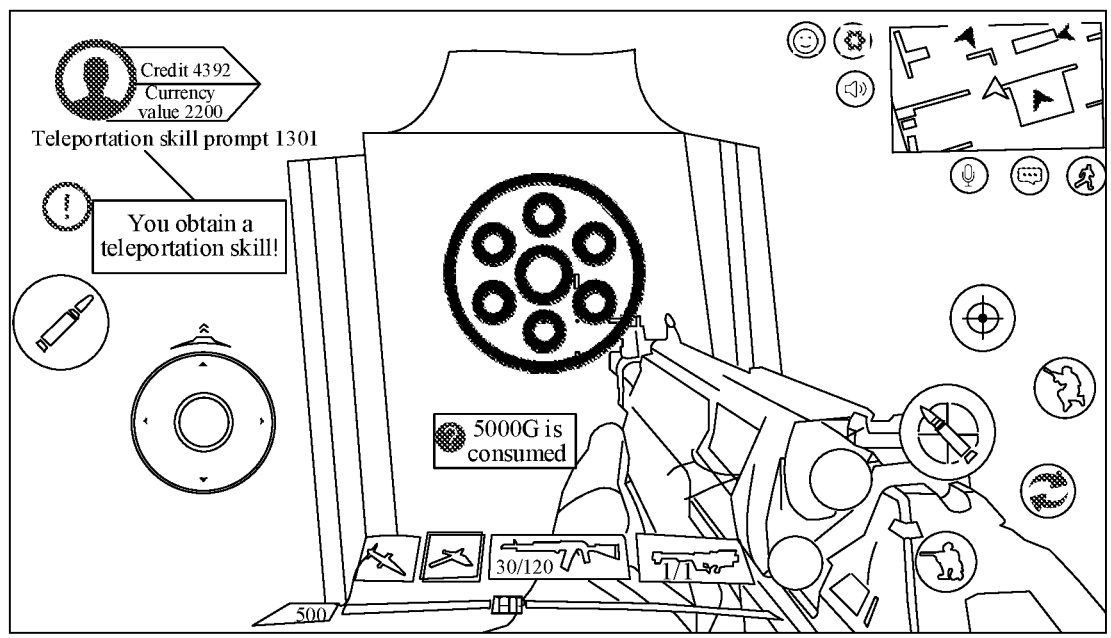
FIG. 13 shows a schematic diagram of a virtual environment interface of obtaining a teleportation skill from a bonus draw prop according to an exemplary embodiment of this application.

FIG. 13 shows a schematic diagram of a virtual environment interface of obtaining a teleportation skill from a bonus draw prop according to an exemplary embodiment of this application. Referring to FIG. 13, the virtual environment interface further includes a teleportation skill prompt 1301, used for prompting that the target virtual object has obtained the teleportation skill. In some embodiments, according to a skill display condition, it is determined whether to display a teleportation skill control after the teleportation skill is obtained.

Step 1006: Display, in response to meeting the skill display condition, the teleportation skill control used for triggering the teleportation skill.

In some embodiments, as described above, the skill display condition includes at least one of a state condition or an environmental condition.

In an example, the skill display condition includes the state condition, and the state condition is implemented as an energy value of the target virtual object being reduced to an energy threshold. In this case, the teleportation skill control is displayed.

Figure 14:
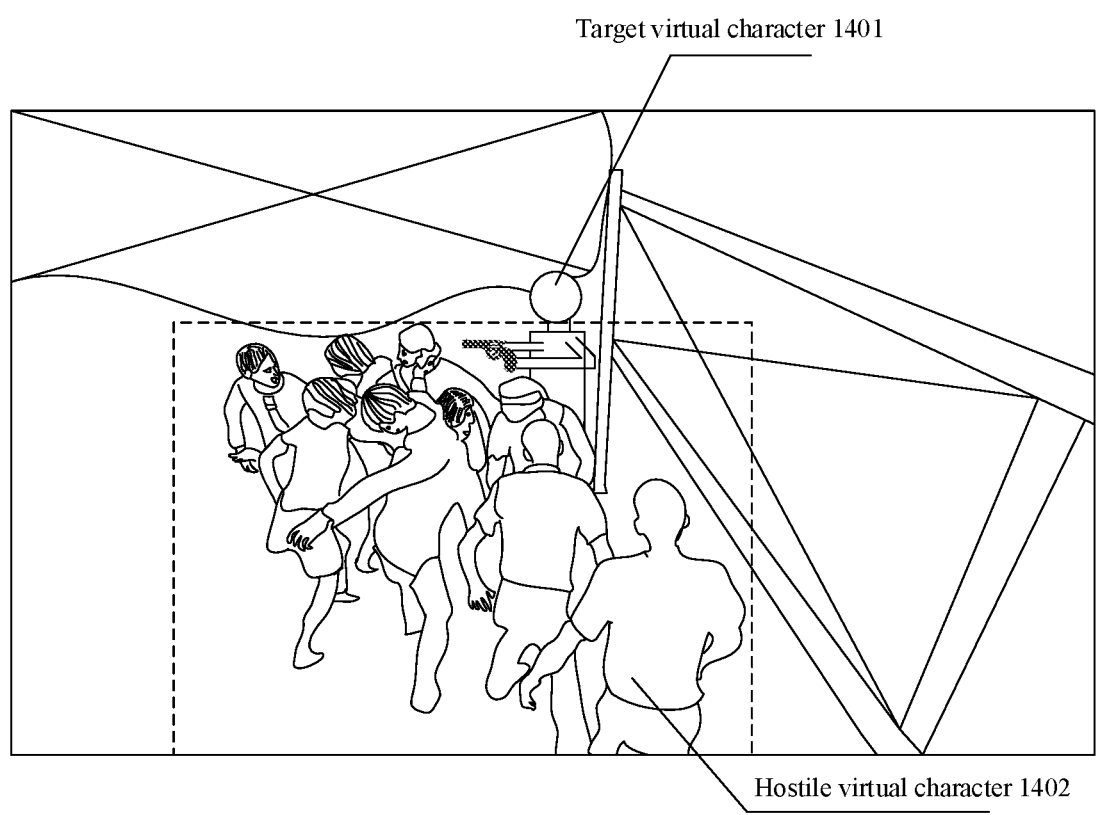
FIG. 14 shows a schematic diagram of a virtual environment according to an exemplary embodiment of this application.

In another example, the skill display condition includes the environmental condition, and the environmental condition means that a quantity of hostile virtual objects in a subregion of the virtual environment reaches a quantity threshold. FIG. 14 shows a schematic diagram of a virtual environment according to an exemplary embodiment of this application. In the virtual environment, there are nine hostile virtual objects 1402 around a target virtual object 1401, and the quantity threshold is seven. In this case, the teleportation skill control is displayed in a virtual environment interface corresponding to the target virtual object.

In some embodiments, the skill display condition may be a combination of the state condition and the environmental condition. In an example, the skill display condition is that the energy value of the target virtual object is reduced to 30% of the energy value, and the virtual environment includes five hostile virtual objects.

Step 1007: Move the target virtual object from a first position to a second position in response to receiving a trigger operation for the teleportation skill control, the first position being a position of the target virtual object in the virtual environment when the trigger operation is received.

Figure 15:
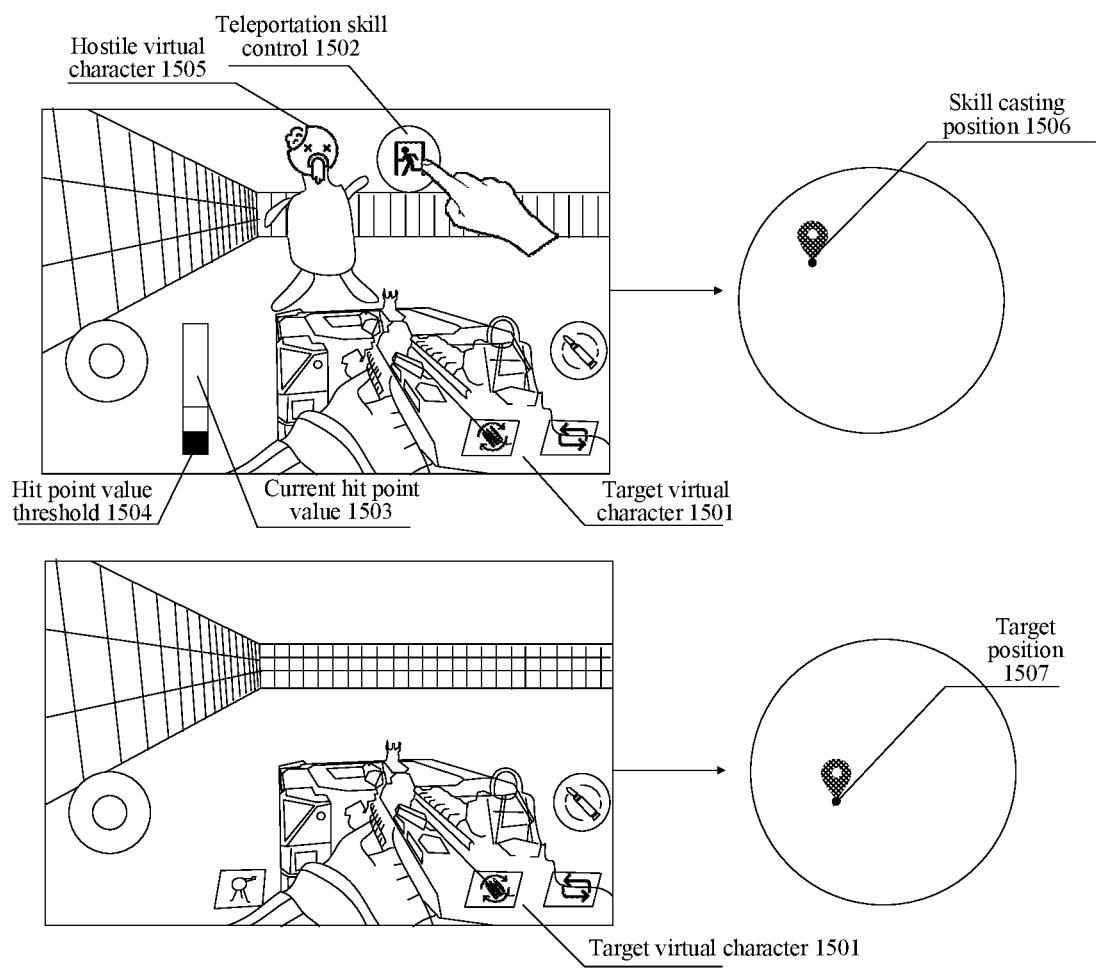
FIG. 15 shows a schematic diagram of a virtual environment interface during using a teleportation skill according to an exemplary embodiment of this application.

FIG. 15 shows a schematic diagram of a virtual environment interface during using a teleportation skill according to an exemplary embodiment of this application. Referring to FIG. 15, the virtual environment interface includes a target virtual object 1501 and a hostile virtual object 1505. In the embodiment shown in FIG. 15, the skill display condition is the state condition, namely, when a hit point 1503 of the target virtual object is less than a hit point threshold 1504, a teleportation skill control 1502 is displayed. Before the skill is casted, a position of the target virtual object 1501 in a map is a first position 1506. After the skill is casted the target virtual object 1501 is moved from the first position 1506 to a second position 1507 in response to receiving the trigger operation for the teleportation skill control.

In conclusion, according to the method provided in this embodiment, a teleportation skill is obtained from a bonus draw prop that provides skills to a target virtual object, and a displayed teleportation skill control is operated when a skill display condition is met. The target virtual object can be moved from a first position to a second position through simply operating the teleportation skill control. In this way, the human-computer interaction efficiency in a process of controlling the target virtual object to move is improved.

Figure 16:
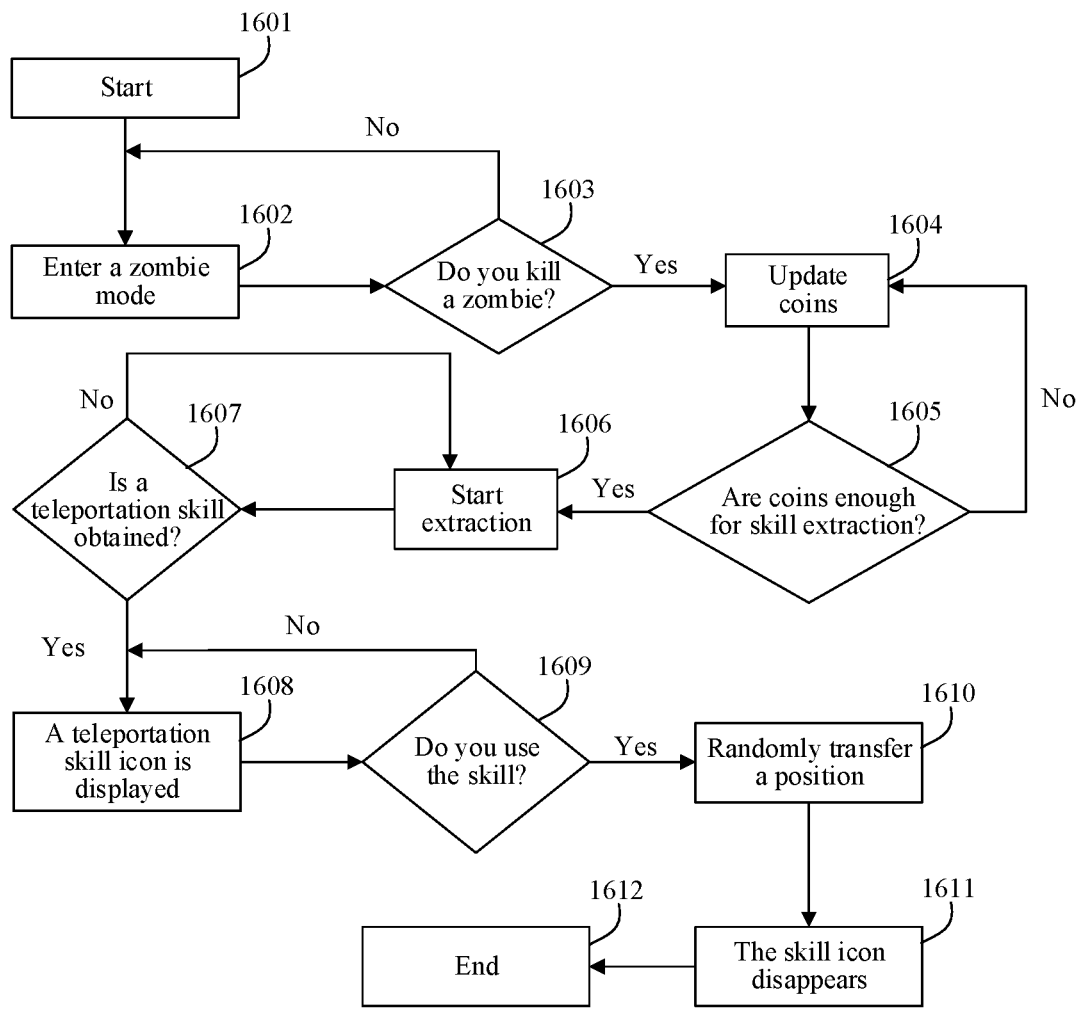
FIG. 16 shows a schematic diagram of an entire process of a virtual object control method in a virtual environment according to an exemplary embodiment of this application.

FIG. 16 shows a schematic diagram of an entire process of a virtual object control method in a virtual environment according to an exemplary embodiment of this application. The method being applicable to an electronic device is used as an example for description, and the method includes:

Step 1601: Start.

In some embodiments, the start refers to game start. In an example, the game start includes loading and entering an environment picture.

Step 1602: Enter a zombie mode.

In some embodiments, the zombie mode is a game mode including a bonus draw prop in a virtual environment.

Step 1603: Determine whether to kill a zombie.

The zombie is a hostile virtual object. In some embodiments, an entirety that kills the zombie is a target virtual object. In an example, coins may be obtained by killing a zombie and generating a second attack signal to a zombie.

When killing the zombie, perform step 1604; otherwise, perform repeatedly step 1602.

Step 1604: Update coins.

The coins are virtual currency, and a quantity of coins of the target virtual object after the target virtual object obtains coins is updated.

Step 1605: Determine whether coins are enough for skill extraction.

When determining that coins are enough, perform step 1606; otherwise, perform repeatedly step 1604.

Step 1606: Start drawing.

Step 1607: Determine whether to obtain a teleportation skill.

It is possible that a skill drawn in a process of the drawing is not the teleportation skill. When the teleportation skill is drawn, perform step 1608; otherwise, perform repeatedly step 1606.

Step 1608: A teleportation skill icon is displayed.

The teleportation skill icon corresponds to a teleportation skill control.

Step 1609: Determine whether to use the skill.

When the skill is used, perform step 1610; otherwise, keep displaying the teleportation skill icon.

Step 1610: Randomly transfer a position.

In some embodiments, the target virtual object is transferred from a first position to a second position.

Step 1611: The skill icon disappears.

In this embodiment, a usage number of the teleportation skill is one time.

Step 1612: End.

In conclusion, according to the method provided in this embodiment, a teleportation skill is obtained from a bonus draw prop that provides skills to a target virtual object, and a displayed teleportation skill control is operated when a skill display condition is met. The target virtual object can be moved from a first position to a second position through simply operating the teleportation skill control. In this way, the human-computer interaction efficiency in a process of controlling the target virtual object to move is improved.

Figure 17:
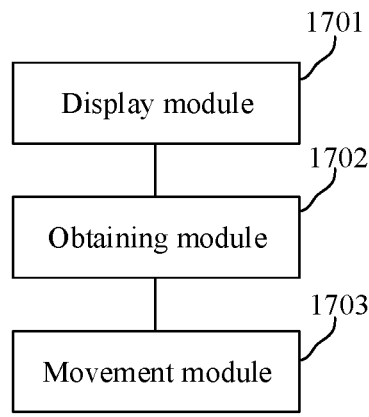
FIG. 17 shows a structural block diagram of a virtual object control apparatus in a virtual environment according to an exemplary embodiment of this application.

FIG. 17 shows a structural block diagram of a virtual object control apparatus in a virtual environment according to an exemplary embodiment of this application. The apparatus includes:

a display module 1701, configured to display an environment picture, the environment picture being a picture of a virtual environment observed by a target virtual object, the virtual environment including a bonus draw prop, the bonus draw prop being used for providing at least two bonus resources to the target virtual object, and the at least two bonus resources including a skill resource;

an obtaining module 1702, configured to draw a teleportation skill from the at least two bonus resources, in response to the target virtual object being within an interactive distance range of the bonus draw prop, where the display module 1701 is configured to display, when a skill display condition is met, a teleportation skill control used for triggering the teleportation skill; and a movement module 1703, configured to move the target virtual object from a first position to a second position in response to receiving a trigger operation for the teleportation skill control, the first position being a position of the target virtual object in the virtual environment when the trigger operation is received.

In some embodiments, the skill display condition includes at least one of a state condition or an environmental condition, the state condition corresponds to the target virtual object, and the environmental condition corresponds to the virtual environment;

the state condition is used for indicating that an energy value of the target virtual object is less than or equal to an energy threshold; and the environmental condition is used for indicating that a quantity of hostile virtual objects in a subregion of the virtual environment is greater than a quantity threshold, and the subregion of the virtual environment are obtained by dividing the virtual environment according to the position of the target virtual object.

In some embodiments, the skill display condition includes the state condition; and the display module 1701 is configured to display the teleportation skill control in response to the energy value of the target virtual object being reduced to the energy threshold.

In some embodiments, the virtual environment further includes a hostile virtual object, the hostile virtual object is a virtual object that attacks the target virtual object.

Figure 18:
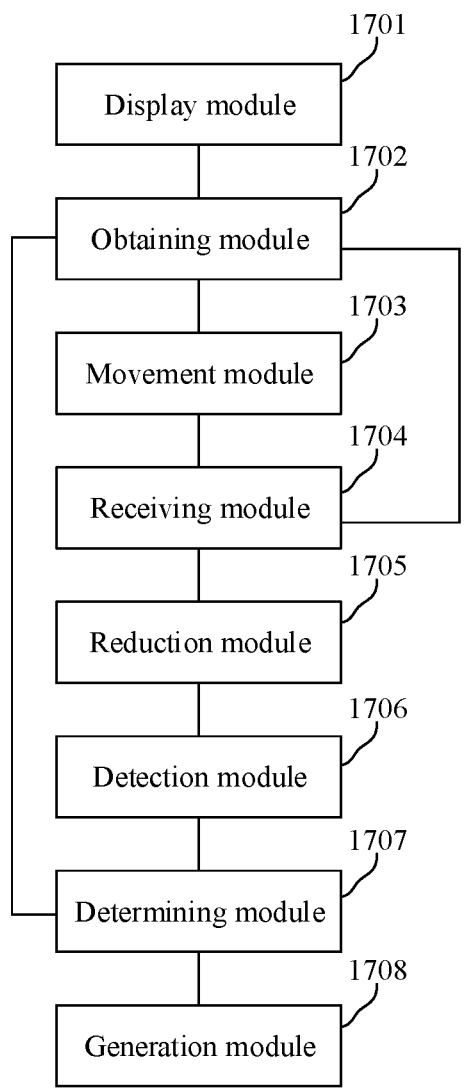
FIG. 18 shows a structural block diagram of a virtual object control apparatus in a virtual environment according to an exemplary embodiment of this application.

Referring to FIG. 18, the apparatus further includes: a receiving module 1704, configured to receive a first attack signal, the first attack signal being a signal generated when a hostile virtual object attacks the target virtual object; and a reduction module 1705, configured to reduce the energy value of the target virtual object corresponding to the first attack signal.

In some embodiments, the skill display condition includes the environmental condition; and the display module 1701 is configured to display the teleportation skill control in response to a quantity of hostile virtual objects in a preset distance range reaching the quantity threshold, the preset distance range being centered on the target virtual object.

In some embodiments, the bonus draw prop corresponds to a collision detection box; and the apparatus further includes: a detection module 1706, configured to perform collision detection between the target virtual object and the bonus draw prop by using the collision detection box;

a determining module 1707, configured to determine, in response to detecting a collision condition existed between the target virtual object and the bonus draw prop, that the target virtual object is in the interactive distance range of the bonus draw prop; and a generation module 1708, configured to generate a skill from the bonus draw prop for the target virtual object.

In some embodiments, the receiving module is configured to receive an attack operation of the target virtual object to a hostile virtual object;

the receiving module 1704 is configured to receive a second attack signal of the target virtual object to the hostile virtual object, the second attack signal being used for indicating that the target virtual object causes an injury event to the hostile virtual object; and the obtaining module 1702 is configured to obtain an exchange resource corresponding to the second attack signal, the exchange resource being used for drawing a bonus resource from the bonus draw prop, and the bonus resource including a teleportation skill.

In some embodiments, the determining module is configured to determine a target positioning point in a map corresponding to the virtual environment in response to receiving the trigger operation for the teleportation skill control;

the obtaining module 1702 is configured to obtain a candidate region corresponding to the target positioning point; and the determining module 1707 is configured to determine a second position in the candidate region.

In some embodiments, at least one candidate positioning point is correspondingly configured in the virtual environment, and the at least one candidate positioning point includes the target positioning point; and the determining module 1707 is configured to randomly determine the target positioning point from the at least one candidate positioning point in response to receiving the trigger operation for the teleportation skill control; or, receive a positioning point selection operation, and determine a candidate positioning point selected by the positioning point selection operation as the target positioning point.

The virtual object control apparatus provided in the foregoing embodiments is illustrated with an example of division of the foregoing functional modules. In actual application, the functions may be allocated to and completed by different functional modules according to requirements, that is, the internal structure of the device is divided into different functional modules, to implement all or some of the functions described above. In this application, the term "unit" or "module" refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit.

Figure 19:
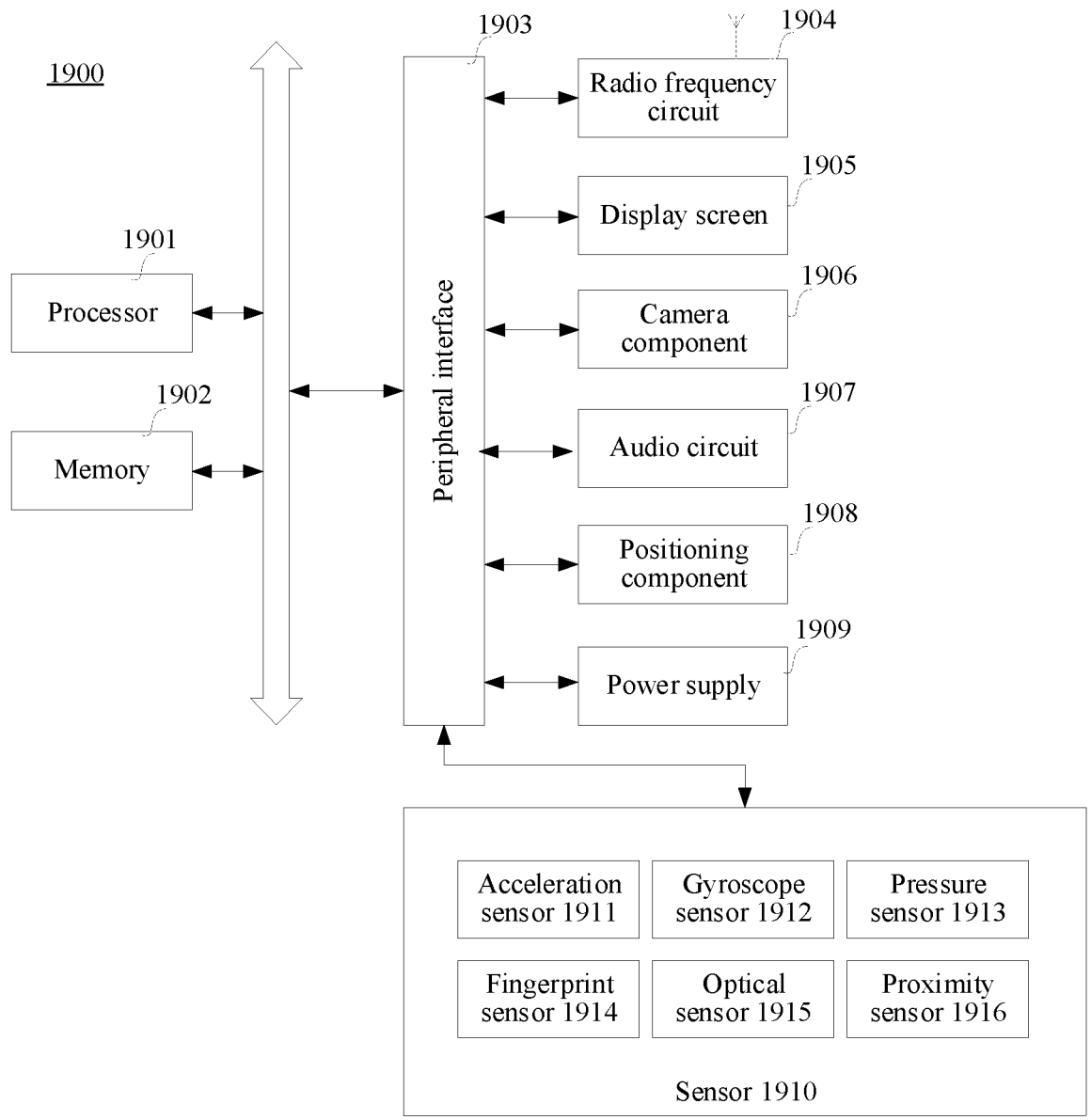
FIG. 19 is a schematic structural diagram of a computer device according to an exemplary embodiment of this application.

FIG. 19 is a structural block diagram of an electronic device 1900 according to an exemplary embodiment of the present disclosure. The electronic device 1900 may be a smartphone, a tablet computer, a moving picture experts group audio layer III (MP3) player, a moving picture experts group audio layer IV (MP4) player, a notebook computer, or a desktop computer. The electronic device 1900 may also be referred to as another name such as user equipment, a portable terminal, a laptop terminal, or a desktop terminal.

Generally, the electronic device 1900 includes a processor 1901 and a memory 1902.

The processor 1901 may include one or more processing cores, and may be, for example, a 4-core processor or an 8-core processor. The processor 1901 may be implemented in at least one hardware form of digital signal processor (DSP), a field-programmable gate array (FPGA), and a programmable logic array (PLA). The processor 1901 may alternatively include a main processor and a coprocessor. The main processor is configured to process data in an active state, also referred to as a central processing unit (CPU). The coprocessor is a low-power processor configured to process data in a standby state. In some embodiments, the processor 1901 may be integrated with a graphics processing unit (GPU). The GPU is configured to render and draw content that needs to be displayed on a display screen. In some embodiments, the processor 1901 may further include an AI processor. The AI processor is configured to process computing operations related to ML.

The memory 1902 may include one or more computer-readable storage media. The computer-readable storage medium may be non-transient. The memory 1902 may further include a high-speed random access memory and a non-transitory memory, for example, one or more magnetic disk storage devices or flash storage devices. In some embodiments, a non-transitory computer-readable storage medium in the memory 1902 is configured to store at least one instruction, the at least one instruction being configured to be executed by the processor 1901 to implement the virtual object control method provided in the method embodiments of this application.

In some embodiments, the electronic device 1900 may include: a peripheral interface 1903 and at least one peripheral. The processor 1901, the memory 1902, and the peripheral interface 1903 may be connected through a bus or a signal cable. Each peripheral device may be connected to the peripheral interface 1903 through a bus, a signal cable, or a circuit board. Specifically, the peripheral device includes: at least one of a radio frequency (RF) circuit 1904, a touch display screen 1905, a camera component 1906, an audio circuit 1907, a positioning component 1908, and a power supply 1909.

The peripheral interface 1903 may be configured to connect the at least one peripheral related to input/output (I/O) to the processor 1901 and the memory 1902. In some embodiments, the processor 1901, the memory 1902, and the peripheral interface 1903 are integrated on the same chip or the same circuit board. In some other embodiments, any or both of the processor 1901, the memory 1902, and the peripheral interface 1903 may be implemented on an independent chip or circuit board, which is not limited in this embodiment.

The RF circuit 1904 is configured to receive and transmit an RF signal, which is also referred to as an electromagnetic signal. The RF circuit 1904 communicates with a communication network and another communication device by using the electromagnetic signal. The RF circuit 1904 converts an electric signal into an electromagnetic signal for transmission, or converts a received electromagnetic signal into an electric signal. In some embodiments, the RF circuit 1904 includes: an antenna system, an RF transceiver, one or more amplifiers, a tuner, an oscillator, a digital signal processor, a codec chip set, a subscriber identity module card, and the like. The RF circuit 1904 may communicate with other terminals through at least one wireless communication protocol. The wireless communication protocol includes, but is not limited to a world wide web, a metropolitan area network, an intranet, generations of mobile communication networks (2G, 3G, 4G, and 5G), a wireless local area network and/or a wireless fidelity (Wi-Fi) network. In some embodiments, the RF circuit 1904 may further include a circuit related to near field communication (NFC), which is not limited in this application.

The display screen 1905 is configured to display a user interface (UI). The UI may include a graph, a text, an icon, a video, and any combination thereof. When the display screen 1905 is a touch display screen, the display screen 1905 is also capable of acquiring a touch signal on or above a surface of the display screen 1905. The touch signal may be used as a control signal to be inputted to the processor 1901 for processing. In this case, the display screen 1905 may be further configured to provide a virtual button and/or a virtual keyboard that are/is also referred to as a soft button and/or a soft keyboard. In some embodiments, there may be one display screen 1905, disposed on a front panel of the electronic device 1900. In some other embodiments, there are at least two display screens 1905, disposed on different surfaces of the electronic device 1900 respectively or in a folded design. In still other embodiments, the display screen 1905 may be a flexible display screen, disposed on a curved surface or a folded surface of the electronic device 1900. Even, the display screen 1905 may be further set in a non-rectangular irregular pattern, namely, a special-shaped screen. The display screen 1905 may be prepared by using materials such as a liquid crystal display (LCD), an organic light-emitting diode (OLED), or the like.

The camera component 1906 is configured to acquire an image or a video. In some embodiments, the camera component 1906 includes a front-facing camera and a rear-facing camera. Generally, the front-facing camera is disposed on the front panel of the terminal, and the rear-facing camera is disposed on a back surface of the terminal. In some embodiments, there are at least two rear-facing cameras, which are respectively any of a main camera, a depth-of-field camera, a wide-angle camera, and a telephoto camera, to achieve background blurring function through fusion of the main camera and the depth-of-field camera, panoramic photographing and virtual reality (VR) photographing through fusion of the main camera and the wide-angle camera, or other fusion photographing functions. In some embodiments, the camera component 1906 may further include a flash. The flash may be a single color temperature flash or a double color temperature flash. The double color temperature flash refers to a combination of a warm flash and a cold flash, and may be configured to perform light ray compensation at different color temperatures.

The audio circuit 1907 may include a microphone and a speaker. The microphone is configured to acquire sound waves of users and surroundings, and convert the sound waves into electrical signals and input the signals to the processor 1901 for processing, or input the signals to the RF circuit 1904 to implement voice communication. For the purpose of stereo sound collection or noise reduction, there may be a plurality of microphones, respectively disposed at different parts of the electronic device 1900. The microphone may be further an array microphone or an omnidirectional collection microphone. The speaker is configured to convert electric signals from the processor 1901 or the RF circuit 1904 into sound waves. The speaker may be a conventional thin-film speaker or a piezoelectric ceramic speaker. When the speaker is the piezoelectric ceramic speaker, the speaker can not only convert an electrical signal into sound waves audible to a human being, but also convert an electrical signal into sound waves inaudible to the human being for ranging and other purposes. In some embodiments, the audio circuit 1907 may also include an earphone jack.

The positioning component 1908 is configured to position a current geographic location of the electronic device 1900, to implement a navigation or a location based service (LBS). The positioning component 1908 may be a positioning component based on the global positioning system (GPS) of the United States, the BeiDou system of China, and the GALILEO system of the European Union.

The power supply 1909 is configured to supply power to components in the electronic device 1900. The power supply 1909 may be an alternating current, a direct current, a primary battery, or a rechargeable battery. When the power supply 1909 includes a rechargeable battery, the rechargeable battery may be a wired rechargeable battery or a wireless rechargeable battery. The wired rechargeable battery is a battery charged through a wired circuit, and the wireless rechargeable battery is a battery charged through a wireless coil. The rechargeable battery may be further configured to support a fast charging technology.

In some embodiments, the electronic device 1900 may also include one or more sensors 1910. The one or more sensors 1910 include, but are not limited to, an acceleration sensor 1911, a gyroscope sensor 1912, a pressure sensor 1913, a fingerprint sensor 1914, an optical sensor 1915, and a proximity sensor 1916.

The acceleration sensor 1911 may detect acceleration on three coordinate axes of a coordinate system established by the electronic device 1900. For example, the acceleration sensor 1911 may be configured to detect components of gravity acceleration on the three coordinate axes. The processor 1901 may control, according to a gravity acceleration signal collected by the acceleration sensor 1911, the touchscreen 1905 to display the user interface in a transverse view or a longitudinal view. The acceleration sensor 1911 may be further configured to acquire motion data of a game or a user.

The gyroscope sensor 1912 may detect a body direction and a rotation angle of the electronic device 1900. The gyroscope sensor 1912 may cooperate with the acceleration sensor 1911 to acquire a 3D action by the user on the electronic device 1900. The processor 1901 may implement the following functions according to the data acquired by the gyroscope sensor 1912: motion sensing (such as changing the UI according to a tilt operation of the user), image stabilization at shooting, game control, and inertial navigation.

The pressure sensor 1913 may be disposed on a side frame of the electronic device 1900 and/or a lower layer of the touch display screen 1905. When the pressure sensor 1913 is disposed at the side frame of the electronic device 1900, a holding signal of the user on the electronic device 1900 may be detected, and left/right hand identification or a quick action may be performed by the processor 1901 according to the holding signal collected by the pressure sensor 1913. When the pressure sensor 1913 is disposed on the low layer of the touchscreen 1905, the processor 1901 controls, according to a pressure operation of the user on the touchscreen 1905, an operable control on the UI. The operable control includes at least one of a button control, a scroll bar control, an icon control, and a menu control.

The fingerprint sensor 1914 is configured to acquire a fingerprint of a user, and the processor 1901 identifies an identity of the user according to the fingerprint acquired by the fingerprint sensor 1914, or the fingerprint sensor 1914 identifies the identity of the user based on the acquired fingerprint. When the identity of the user is identified as a trusted identity, the processor 1901 authorizes the user to perform a related sensitive operation. The sensitive operation includes unlocking a screen, viewing encrypted information, downloading software, payment, changing settings, and the like. The fingerprint sensor 1914 may be disposed on a front face, a rear face, or a side face of the electronic device 1900. When a physical button or a vendor logo is disposed on the electronic device 1900, the fingerprint sensor 1914 may be integrated with the physical button or the vendor logo.

The optical sensor 1915 is configured to collect ambient light intensity. In an embodiment, the processor 1901 may control display brightness of the touch display screen 1905 according to the ambient light intensity collected by the optical sensor 1915. Specifically, when the ambient light intensity is relatively high, the display brightness of the touch display 1905 is increased. When the ambient light intensity is relatively low, the display brightness of the touch display 1905 is reduced. In another embodiment, the processor 1901 may further dynamically adjust a camera parameter of the camera component 1906 according to the ambient light intensity collected by the optical sensor 1915.

The proximity sensor 1916, also referred to as a distance sensor, is usually disposed on the front panel of the electronic device 1900. The proximity sensor 1916 is configured to collect a distance between the user and a front face of the electronic device 1900. In an embodiment, when the proximity sensor 1916 detects that the distance between the user and the front of the electronic device 1900 is gradually smaller, the processor 1901 controls the touch display 1905 to be switched from a screen-on state to a screen-off state. When the proximity sensor 1916 detects that the distance between the user and the front surface of the electronic device 1900 gradually increases, the touch display screen 1905 is controlled by the processor 1901 to switch from the screen-off state to the screen-on state.

A person skilled in the art may understand that a structure shown in FIG. 19 constitutes no limitation on the electronic device 1900, and the electronic device may include more or fewer components than those shown in the figure, or some components may be combined, or a different component deployment may be used.

An embodiment of this application further provides a computer-readable storage medium, storing at least one instruction, at least one program, a code set, or an instruction set, the at least one instruction, the at least one program, the code set, or the instruction set being loaded and executed by a processor to implement the virtual object control method.

This application further provides a computer program product or a computer program. The computer program product or the computer program includes computer instructions, and the computer instructions are stored in a computer-readable storage medium. A processor of a computer device reads the computer instructions from the computer-readable storage medium and executes the computer instructions to cause the computer device to perform the virtual object control method according to any one of the foregoing embodiments.

A person of ordinary skill in the art may understand that all or some of the steps of the methods in the embodiments may be implemented by a program instructing relevant hardware. The program may be stored in a computer-readable storage medium. The computer-readable storage medium may be the computer-readable storage medium included in the memory in the foregoing embodiment, or may be a computer-readable storage medium that exists independently and that is not assembled in a terminal. The computer-readable storage medium stores at least one instruction, at least one program, a code set, or an instruction set, the at least one instruction, the at least one program, the code set, or the instruction set being loaded and executed by a processor to implement the virtual object control method.

In some embodiments, the computer-readable storage medium may include: a read-only memory (ROM), a random access memory (RAM), a solid state drive (SSD), an optical disc, or the like. The RAM may include a resistance random access memory (ReRAM) and a dynamic random access memory (DRAM). The sequence numbers of the foregoing embodiments of this application are merely for description purpose, and are not intended to indicate priorities of the embodiments.

A person of ordinary skill in the art may understand that all or some of the steps of the foregoing embodiments may be implemented by hardware, or may be implemented by a program instructing relevant hardware. The program may be stored in a computer-readable storage medium. The storage medium may be a read-only memory, a magnetic disk, an optical disc, or the like.

The foregoing descriptions are merely embodiments of this application, but are not intended to limit this application. Any modification, equivalent replacement, or improvement made within the spirit and principle of this application shall fall within the protection scope of this application.

What is claimed is:

1. A method for relocating a virtual object in a virtual environment of a game performed by an electronic device, the method comprising:
    displaying an environment picture of the virtual environment of the game observed by a target virtual object, the virtual environment comprising a bonus draw prop, the bonus draw prop being used for providing at least two bonus resources to the target virtual object;
    receiving a movement instruction from a user of the electronic device;
    in response to the movement instruction, moving the target virtual object towards the bonus draw prop;
    drawing a teleportation skill from the at least two bonus resources in response to the target virtual object being moved within an interactive distance range of the bonus draw prop;
    in accordance with a determination that a skill display condition is met, displaying, on the environment picture, a teleportation skill control used for triggering the teleportation skill;
    receiving a user selection of the teleportation skill control by the user of the electronic device; and
    in response to the user selection of the teleportation skill control, moving the target virtual object from a first position to a second position, the first position being a current position of the target virtual object in the virtual environment and the second position being a randomly determined position in the virtual environment by the teleportation skill.

2. The method according to claim 1, wherein the skill display condition comprises at least one of a state condition or an environmental condition, the state condition corresponds to the target virtual object, and the environmental condition corresponds to the virtual environment;
    the state condition comprises that an energy value of the target virtual object is less than or equal to an energy threshold; and
    the environmental condition comprises that a quantity of hostile virtual objects in a subregion of the virtual environment is greater than a quantity threshold, and the subregion of the virtual environment is obtained by dividing the virtual environment according to the position of the target virtual object in the virtual environment.

3. The method according to claim 2, wherein the skill display condition comprises the state condition; and
    the displaying, on the environment picture, the teleportation skill control used for triggering the teleportation skill comprises:
        displaying the teleportation skill control in response to the energy value of the target virtual object being reduced to the energy threshold.

4. The method according to claim 3, wherein the virtual environment further comprises a hostile virtual object, the hostile virtual object being a virtual object that attacks the target virtual object; and
    before the displaying the teleportation skill control in response to the energy value of the target virtual object being reduced to the energy threshold, the method comprises:
        receiving a first attack signal, the first attack signal being a signal generated when the hostile virtual object attacks the target virtual object; and
        reducing the energy value of the target virtual object corresponding to the first attack signal.

5. The method according to claim 2, wherein the skill display condition comprises the environmental condition; and
    the displaying, on the environment picture, the teleportation skill control used for triggering the teleportation skill comprises:
        displaying the teleportation skill control in response to a quantity of hostile virtual objects in a preset distance range reaching the quantity threshold, the preset distance range being centered on the target virtual object.

6. The method according to claim 1, wherein the bonus draw prop corresponds to a collision detection box; and
    before the drawing a teleportation skill from the at least two bonus resources in response to the target virtual object being moved within an interactive distance range of the bonus draw prop, the method comprises:
        performing collision detection between the target virtual object and the bonus draw prop by using the collision detection box; and
        determining, in response to detecting a collision between the target virtual object and the bonus draw prop, that the target virtual object is in the interactive distance range of the bonus draw prop.

7. The method according to claim 1, wherein before the drawing a teleportation skill from the at least two bonus resources, the method further comprises:
    receiving an attack operation of the target virtual object on the hostile virtual object;
    receiving a second attack signal of the target virtual object to the hostile virtual object, the second attack signal being used for indicating that the target virtual object causes an injury event to the hostile virtual object; and
    obtaining an exchange resource corresponding to the second attack signal, the exchange resource being used for drawing the bonus resource from the bonus draw prop, and the bonus resource comprising the teleportation skill.

8. The method according to claim 1, wherein before the moving the target virtual object from a first position to a second position, the method further comprises:
    determining a target positioning point in a map corresponding to the virtual environment in response to receiving the trigger operation for the teleportation skill control;
    obtaining a candidate region corresponding to the target positioning point; and
    determining the second position within the candidate region.

9. The method according to claim 8, wherein at least one candidate positioning point is correspondingly configured in the virtual environment, and the at least one candidate positioning point comprises the target positioning point; and
    the determining a target positioning point in a virtual map corresponding to the virtual environment in response to receiving the trigger operation for the teleportation skill control comprises:
        randomly determining the target positioning point from the at least one candidate positioning point in response to receiving the trigger operation for the teleportation skill control; or, receiving a positioning point selection operation, and determining a candidate positioning point selected by the positioning point selection operation as the target positioning point.

10. The method according to claim 1, wherein the at least two bonus resources are of different types including one skill-type and one prop-type.

11. An electronic device, comprising: a processor and a memory, the memory storing at least one program, the at least one program, when executed by the processor, causing the electronic device to implement a method for relocating a virtual object in a virtual environment of a game, the method including:
  displaying an environment picture of the virtual environment of the game observed by a target virtual object, the virtual environment comprising a bonus draw prop, the bonus draw prop being used for providing at least two bonus resources to the target virtual object;
  receiving a movement instruction from a user of the electronic device;
  in response to the movement instruction, moving the target virtual object towards the bonus draw prop;
  drawing a teleportation skill from the at least two bonus resources in response to the target virtual object being moved within an interactive distance range of the bonus draw prop;
  in accordance with a determination that a skill display condition is met, displaying, on the environment picture, a teleportation skill control used for triggering the teleportation skill;
  receiving a user selection of the teleportation skill control by the user of the electronic device; and
  in response to the user selection of the teleportation skill control, moving the target virtual object from a first position to a second position, the first position being a current position of the target virtual object in the virtual environment and the second position being a randomly determined position in the virtual environment by the teleportation skill.

12. The electronic device according to claim 11, wherein the skill display condition comprises at least one of a state condition or an environmental condition, the state condition corresponds to the target virtual object, and the environmental condition corresponds to the virtual environment;
  the state condition comprises that an energy value of the target virtual object is less than or equal to an energy threshold; and
  the environmental condition comprises that a quantity of hostile virtual objects in a subregion of the virtual environment is greater than a quantity threshold, and the subregion of the virtual environment is obtained by dividing the virtual environment according to the position of the target virtual object in the virtual environment.

13. The electronic device according to claim 12, wherein the skill display condition comprises the state condition; and
  the displaying, on the environment picture, the teleportation skill control used for triggering the teleportation skill comprises:
    displaying the teleportation skill control in response to the energy value of the target virtual object being reduced to the energy threshold.

14. The electronic device according to claim 12, wherein the skill display condition comprises the environmental condition; and
  the displaying, on the environment picture, the teleportation skill control used for triggering the teleportation skill comprises:
    displaying the teleportation skill control in response to a quantity of hostile virtual objects in a preset distance range reaching the quantity threshold, the preset distance range being centered on the target virtual object.

15. The electronic device according to claim 11, wherein the bonus draw prop corresponds to a collision detection box; and
  before the drawing a teleportation skill from the at least two bonus resources in response to the target virtual object being within an interactive distance range of the bonus draw prop, the virtual object control method comprises:
    performing collision detection between the target virtual object and the bonus draw prop by using the collision detection box; and
    determining, in response to detecting a collision between the target virtual object and the bonus draw prop, that the target virtual object is in the interactive distance range of the bonus draw prop.

16. The electronic device according to claim 11, wherein before the drawing a teleportation skill from the at least two bonus resources, the virtual object control method further comprises:
  receiving an attack operation of the target virtual object on the hostile virtual object;
  receiving a second attack signal of the target virtual object to the hostile virtual object, the second attack signal being used for indicating that the target virtual object causes an injury event to the hostile virtual object; and
  obtaining an exchange resource corresponding to the second attack signal, the exchange resource being used for drawing the bonus resource from the bonus draw prop, and the bonus resource comprising the teleportation skill.

17. The electronic device according to claim 11, wherein before the moving the target virtual object from a first position to a second position, the virtual object control method further comprises:
  determining a target positioning point in a map corresponding to the virtual environment in response to receiving the trigger operation for the teleportation skill control;
  obtaining a candidate region corresponding to the target positioning point; and
  determining the second position within the candidate region.

18. A non-transitory computer-readable storage medium, storing at least one program, the at least one program, when executed by a processor of an electronic device, causing the electronic device to implement a method for relocating a virtual object in a virtual environment of a game, the method including:
  displaying an environment picture of the virtual environment of the game observed by a target virtual object, the virtual environment comprising a bonus draw prop, the bonus draw prop being used for providing at least two bonus resources to the target virtual object;
  receiving a movement instruction from a user of the electronic device;
  in response to the movement instruction, moving the target virtual object towards the bonus draw prop;
  drawing a teleportation skill from the at least two bonus resources in response to the target virtual object being moved within an interactive distance range of the bonus draw prop;

in accordance with a determination that a skill display condition is met, displaying, on the environment picture, a teleportation skill control used for triggering the teleportation skill;

receiving a user selection of the teleportation skill control by the user of the electronic device; and in response to the user selection of the teleportation skill control, moving the target virtual object from a first position to a second position, the first position being a current position of the target virtual object in the virtual environment and the second position being a randomly determined position in the virtual environment by the teleportation skill.

19. The non-transitory computer-readable storage medium according to claim 18, wherein the skill display condition comprises at least one of a state condition or an environmental condition, the state condition corresponds to the target virtual object, and the environmental condition corresponds to the virtual environment;

the state condition comprises that an energy value of the target virtual object is less than or equal to an energy threshold; and the environmental condition comprises that a quantity of hostile virtual objects in a subregion of the virtual environment is greater than a quantity threshold, and the subregion of the virtual environment is obtained by dividing the virtual environment according to the position of the target virtual object in the virtual environment.

20. The non-transitory computer-readable storage medium according to claim 18, wherein the skill display condition comprises the state condition; and the displaying, on the environment picture, the teleportation skill control used for triggering the teleportation skill comprises:

displaying the teleportation skill control in response to the energy value of the target virtual object being reduced to the energy threshold.

* * * * *